(12) United States Patent
Nakayama

(10) Patent No.: US 11,318,719 B2
(45) Date of Patent: May 3, 2022

(54) INTERLAYER FOR LAMINATED GLASS, AND LAMINATED GLASS

(71) Applicant: SEKISUI CHEMICAL CO., LTD., Osaka (JP)

(72) Inventor: Kazuhiko Nakayama, Shiga (JP)

(73) Assignee: SEKISUI CHEMICAL CO., LTD., Osaka (JP)

(*) Notice: Subject to any disclaimer, the term of this patent is extended or adjusted under 35 U.S.C. 154(b) by 758 days.

(21) Appl. No.: 16/080,576

(22) PCT Filed: Mar. 31, 2017

(86) PCT No.: PCT/JP2017/013642
§ 371 (c)(1),
(2) Date: Aug. 28, 2018

(87) PCT Pub. No.: WO2017/171018
PCT Pub. Date: Oct. 5, 2017

(65) Prior Publication Data
US 2021/0187914 A1 Jun. 24, 2021

(30) Foreign Application Priority Data
Mar. 31, 2016 (JP) .............................. JP2016-073210

(51) Int. Cl.
*B32B 17/10* (2006.01)
*B32B 3/26* (2006.01)
(Continued)

(52) U.S. Cl.
CPC ........ *B32B 17/10568* (2013.01); *B32B 3/263* (2013.01); *B32B 3/28* (2013.01);
(Continued)

(58) Field of Classification Search
CPC .. B32B 3/263; B32B 3/28; B32B 3/30; B32B 17/10036; B32B 17/10568;
(Continued)

(56) References Cited

U.S. PATENT DOCUMENTS

2004/0191482 A1* 9/2004 Nakajima ............. B29C 59/022
428/156
2007/0009714 A1 1/2007 Lee et al.
(Continued)

FOREIGN PATENT DOCUMENTS

| CN | 101038349 | 9/2007 |
|---|---|---|
| CN | 104507887 | 4/2015 |

(Continued)

OTHER PUBLICATIONS

Office Action dated Jul. 29, 2020 in corresponding European Patent Application No. 17 775 549.3.
(Continued)

*Primary Examiner* — Megha M Gaitonde
(74) *Attorney, Agent, or Firm* — Wenderoth, Lind & Ponack, L.L.P.

(57) ABSTRACT

The present invention aims to provide an interlayer film for a laminated glass that can, even when having a thickness at the thickest portion of 850 μm or more, exhibit sufficient deaeration properties in production of a laminated glass to provide a laminated glass with high transparency, and a laminated glass produced using the interlayer film for a laminated glass. Provided is an interlayer film for a laminated glass having a large number of recesses on at least one surface, the interlayer film for a laminated glass having a thickness T (μm) measured in conformity with JIS K-6732 (1996) and a maximum height roughness Ry (μm) measured in conformity with JIS B-0601 (1994) at a thickest portion,
(Continued)

the thickness T and the maximum height roughness Ry satisfying the following expressions (1) and (1'):

$$Ry \geq 0.020 \times T + 16.6 \quad (1),$$

$$T \geq 850 \quad (1').$$

12 Claims, 5 Drawing Sheets

(51) Int. Cl.
*B32B 3/28* (2006.01)
*B32B 3/30* (2006.01)

(52) U.S. Cl.
CPC .......... *B32B 3/30* (2013.01); *B32B 17/10036* (2013.01); *B32B 17/10587* (2013.01); *B32B 17/10596* (2013.01); *B32B 17/10761* (2013.01); *B32B 2307/102* (2013.01); *B32B 2307/412* (2013.01); *B32B 2307/538* (2013.01); *B32B 2309/06* (2013.01); *B32B 2315/08* (2013.01)

(58) Field of Classification Search
CPC ........ B32B 17/10587; B32B 17/10596; B32B 17/10761; B32B 2307/102; B32B 2307/412; B32B 2307/538; B32B 2309/06; B32B 2315/08; Y10T 428/24479; Y10T 428/24537; Y10T 428/2457; Y10T 428/24942; Y10T 428/2495
USPC ................ 428/156, 163, 167, 212, 213, 220
See application file for complete search history.

(56) References Cited

U.S. PATENT DOCUMENTS

| | | | |
|---|---|---|---|
| 2008/0176043 A1* | 7/2008 | Masaki | B32B 17/10036 428/172 |
| 2008/0268204 A1 | 10/2008 | Bourcier et al. | |
| 2009/0294212 A1 | 12/2009 | Miyai | |
| 2015/0174862 A1 | 6/2015 | Kitano et al. | |
| 2016/0151995 A1 | 6/2016 | Kitano et al. | |

FOREIGN PATENT DOCUMENTS

| | | |
|---|---|---|
| JP | 9-40444 | 2/1997 |
| JP | 2001-150540 | 6/2001 |
| JP | 2007-223883 | 9/2007 |
| JP | 2007-331959 | 12/2007 |
| JP | 2008-201667 | 9/2008 |
| JP | 2010-524843 | 7/2010 |
| JP | 2013-1594 | 1/2013 |
| JP | 2015-059052 | 3/2015 |
| JP | 2015-107915 | 6/2015 |
| WO | 2007/132777 | 11/2007 |
| WO | 2008/134594 | 11/2008 |
| WO | 2014/168793 | 10/2014 |
| WO | 2015/016361 | 2/2015 |

OTHER PUBLICATIONS

International Search Report dated May 9, 2017 in International (PCT) Application No. PCT/JP2017/013642.
Extended European Search Report dated Nov. 12, 2019 in corresponding European Patent Application No. 17775549.9.
Extended European Search Report dated Jan. 22, 2021 in corresponding European Patent Application No. 20201764.6.

\* cited by examiner (a)

(b)

(c)

INTERLAYER FOR LAMINATED GLASS, AND LAMINATED GLASS

TECHNICAL FIELD

The present invention relates to an interlayer film for a laminated glass that can, even when having a thickness at the thickest portion of 850 μm or more, exhibit sufficient deaeration properties in production of a laminated glass to provide a laminated glass with high transparency, and a laminated glass produced using the interlayer film for a laminated glass.

BACKGROUND ART

Laminated glass is less likely to scatter even when shattered by external impact and can be safely used. Due to this advantage, laminated glass has been widely used, for example, in windshield, rear glass and side glass of vehicles including automobiles and windowpanes of aircraft, buildings, or the like. A known example of laminated glass is a type of laminated glass including at least a pair of glass plates integrated through, for example, an interlayer film for a laminated glass which contains a liquid plasticizer and polyvinyl acetal.

In common production of a laminated glass, a laminate including at least two glass plates and an interlayer film for a laminated glass interposed between the two glass plates is passed through nip rolls for deaeration (squeeze deaeration) or put in a rubber bag and vacuum suctioned (vacuum deaeration) to be preliminarily pressure-bonded while the air remaining between the glass plates and the interlayer film is removed. The resulting laminate is pressurized with heat, for example, in an autoclave to be finally pressure-bonded. Thus, a laminated glass is produced. In production of a laminated glass, deaeration properties are important upon stacking of a glass plate and an interlayer film for laminated glass. The interlayer film for a laminated glass has fine recesses on at least one surface for the purpose of ensuring deaeration properties in production of a laminated glass.

Recently, the properties required of laminated glass have been increasingly diversified, which complicates the structure of the interlayer film for a laminated glass. For example, study is now made on a wedge-shaped interlayer film (e.g., Patent Literature 1) that has a wedge-shaped cross section in the thickness direction to enable the resulting laminated glass to be used as a head-up display, a sound insulation interlayer film (e.g., Patent Literature 2) that includes a combination of a sound insulation layer and a protective layer to exhibit sound insulation properties, and an interlayer film combining these characteristics to exhibit both properties.

In the interlayer film for a laminated glass with such a complicated structure, the thickness of the entire interlayer film for a laminated glass tends to increase because the number of resin layers combined increases. In some cases, the thickness at the thickest portion is 850 μm or more. In production of a laminated glass using such a thick interlayer film for a laminated glass, however, the deaeration properties may be disadvantageously lowered, leading to reduction in transparency of the resulting laminated glass.

CITATION LIST

Patent Literature

Patent Literature 1: WO 2007/132777
Patent Literature 2: JP 2007-331959 A

SUMMARY OF INVENTION

Technical Problem

The present invention aims to, in consideration of the state of the art, provide an interlayer film for a laminated glass that can, even when having a thickness at the thickest portion of 850 μm or more, exhibit sufficient deaeration properties in production of a laminated glass to provide a laminated glass with high transparency, and a laminated glass produced using the interlayer film for a laminated glass.

Solution to Problem

The present invention relates to an interlayer film for a laminated glass having a large number of recesses on at least one surface, the interlayer film for a laminated glass having a thickness T (μm) measured in conformity with JIS K-6732 (1996) and a maximum height roughness Ry (μm) measured in conformity with JIS B-0601 (1994) at a thickest portion, the thickness T and the maximum height roughness Ry satisfying the following expressions (1) and (1'):

$$Ry \geq 0.020 \times T + 16.6 \quad (1),$$

$$T \geq 850 \quad (1').$$

The present invention is specifically described in the following.

The present inventors studied in detail about the conditions for ensuring sufficient deaeration properties even in production of a laminated glass using a thick interlayer film for a laminated glass with a thickness at the thickest portion of 850 μm or more. As a result, they found out that, when the thickness T (μm) at the thickest portion of the film measured in conformity with JIS K-6732 (1996) (hereafter, also simply referred to as "thickness T at the thickest portion of the film") and the maximum height roughness Ry (μm) at the thickest portion measured in conformity with JIS B-0601 (1994) (hereafter, also simply referred to as "maximum height roughness Ry at the thickest portion") satisfy a predetermined relation, such an interlayer film for a laminated glass can exhibit sufficient deaeration properties to enable production of a laminated glass with high transparency. Thus, the present invention was completed.

The interlayer film for a laminated glass of the present invention has a large number of recesses on at least one surface. The recesses ensure deaeration properties in production of a laminated glass.

Preferably, the recesses each have a groove shape with a continuous bottom, and the recesses adjacent to each other are regularly formed in parallel to each other. Commonly, easiness of deaeration upon preliminary pressure bonding and final pressure bonding of a laminate including two glass plates and an interlayer film for a laminated glass interposed between the two glass plates closely relates to the communication properties and smoothness of the bottoms of the recesses. When the recesses having a groove shape with a continuous bottom on at least one surface of the interlayer film are regularly formed parallel to each other, the communication properties of the bottoms are enhanced to markedly increase the deaeration properties upon preliminary pressure bonding and final pressure bonding.

The phrase "regularly formed" here may refer to both a state where the recesses formed are adjacent and parallel to each other at equal intervals and a state where the recesses formed are adjacent and parallel to each other but all the intervals between adjacent recesses are not necessarily equal to each other.

FIGS. 1 and 2 each schematically illustrate an exemplary interlayer film for a laminated glass in which recesses having a groove shape with a continuous bottom formed on the surface are adjacent and parallel to each other at equal intervals.

In the interlayer film for a laminated glass of the present invention, the thickness T at the thickest portion of the film and the maximum height roughness Ry at the thickest portion satisfy the expressions (1) and (1').

In the above expression (1) and the following expression (2), Ry is the average (hereafter, also referred to as "Ry (Ave)") of Ry on a first surface of the interlayer film for a laminated glass and Ry on a second surface, the opposite surface of the first surface, of the interlayer film for a laminated glass.

The present inventors presumed the cause of the reduction in the transparency of a laminated glass after deaeration as follows. When a conventional thick interlayer film for a laminated glass is used in production of a laminated glass, the pressure at peripheral portions of the laminated glass tends to increase during the deaeration step, and therefore, the peripheral portions of the film adhere to the glass at an early stage, which results in completion of the production of the laminated glass in a state where the deaeration is not completely performed. They found out that satisfaction of the expressions (1) and (1') by the thickness T at the thickest portion of the film and the maximum height roughness Ry at the thickest portion prevents adhesion of the peripheral portions of the film to the glass at an early stage, resulting in production of a laminated glass with sufficiently high transparency after deaeration.

As shown in the expression (1'), the thickness T at the thickest portion of the film is 850 μm or more. The excellent effect of the present invention is exhibited in the case where the thickness T at the thickest portion of the film is 850 μm or more. The thickness T at the thickest portion of the film is preferably 860 μm or more, more preferably 900 μm or more, still more preferably 910 μm or more, particularly preferably 1,000 μm or more, most preferably 1,100 μm or more. The upper limit of the thickness T at the thickest portion of the film is not particularly limited. For sufficiently improving the handleability of the interlayer film for a laminated glass, the maximum thickness of the entire interlayer film for a laminated glass of the present invention is preferably 2,800 μm or less.

The excellent effect of the present invention can be exhibited at a region where the thickness of the film is 850 μm or more even in the case where the interlayer film for a laminated glass of the present invention has, for example, a wedge-shaped cross section in the thickness direction.

The thickness at the thinnest portion of the interlayer film for a laminated glass of the present invention is preferably 750 μm or more. When the thickness at the thinnest portion is 750 μm or more, the difference in the thickness between the thickest portion and the thinnest portion is small. With such a structure, the pressure applied to the peripheral portions of the laminated glass can be dispersed to further prevent adhesion of the peripheral portions of the film to the glass at an early stage, leading to production of a laminated glass with still higher transparency after deaeration. The thickness at the thinnest portion is more preferably 800 μm or more, still more preferably 850 μm or more, particularly preferably 860 μm or more, most preferably 900 μm or more.

The interlayer film for a laminated glass of the present invention preferably further satisfies the following expression (2).

$$Ry \geq 0.025 \times T + 14.0 \quad (2)$$

In the case where the thickness T at the thickest portion of the film and the maximum height roughness Ry at the thickest portion satisfy the expression (2), the interlayer film for a laminated glass exhibits sufficient deaeration properties in production of a laminated glass to further enhance the transparency of the laminate after the preliminary pressure bonding.

The interlayer film for a laminated glass of the present invention preferably further satisfies the following expression (3).

$$Ry \leq 0.0195 \times T + 33.2 \quad (3)$$

In the above expression (3) and the following expression (4), Ry refers to either larger one of Ry on the first surface of the interlayer film for a laminated glass and Ry on the second surface, the opposite side surface of the first surface, of the interlayer film for a laminated glass (hereafter, also referred to as "Ry(Max)").

The present inventors presumed the cause of the reduction in the transparency of a laminated glass after deaeration as follows. When a conventional thick interlayer film for a laminated glass is used in production of a laminated glass, the pressure at peripheral portions of the laminated glass tends to increase during the deaeration step, and therefore, the peripheral portions of the film adhere to the glass at an early stage, which results in completion of the production of the laminated glass in a state where the deaeration is not completely performed. The present inventors also presumed that an increase of Ry only with an aim of sufficiently improving the deaeration properties prolongs the time for adhesion of the film to the glass even after sufficient deaeration at the central portion of the laminated glass, leading to reduction in the production efficiency. In the case where the thickness T at the thickest portion of the film and the maximum height roughness Ry at the thickest portion satisfy the expression (3), adhesion of the film to the glass is performed immediately after sufficient deaeration. Thus, an interlayer film for a laminated glass capable of improving the production efficiency of a laminated glass is produced.

The interlayer film for a laminated glass of the present invention preferably further satisfies the following expression (4).

$$Ry \leq 0.0159 \times T + 32.2 \quad (4)$$

In the case where the thickness T at the thickest portion of the film and the maximum height roughness Ry at the thickest portion satisfy the expression (4), an interlayer film for a laminated glass capable of further improving the production efficiency of a laminated glass can be obtained.

The thickness T at the thickest portion of the film is measured in conformity with JIS K-6732 (1996). Specifically, the thickness is measured at 5-cm intervals from one end to the other end of a sample interlayer film for a laminated glass in the direction perpendicular to the extruding direction using a constant pressure thickness gauge (e.g., FFD-2 available from OZAKI MFG. Co., Ltd.). The measurement is performed in an environment of a temperature of 23° C. and a humidity of 30 RH %.

The thickness T at the thickest portion of the film refers to a thickness at the thickest point in the measurement of the thickness of the film by the above method.

The extruding direction of the interlayer film for a laminated glass upon production thereof can be confirmed, for example, by the following method.

Specifically, the interlayer film for a laminated glass is stored in a thermostat bath at 140° C. for 30 minutes, and one of the parallel direction and vertical direction of the film, in which the shrinkage rate is greater, is the extruding direction. Also, the extruding direction is confirmed based on the winding direction of a roll of the interlayer film for a laminated glass. Since an interlayer film for a laminated glass is wound into a roll in the extruding direction of the film in production thereof, the winding direction of a roll of the interlayer film for a laminated glass is coincide with the extruding direction of the film in production of the interlayer film for a laminated glass.

The maximum height roughness Ry at the thickest portion is measured in conformity with JIS B-0601 (1994).

Specifically, the measurement is performed in a direction perpendicular to the groove shape with a continuous bottom, or in the case where the recesses are formed by embossing utilizing melt fracture, in a direction parallel to the extruding direction. The measurement is performed under the conditions of a cut-off value of 2.5 mm, a reference length of 2.5 mm, a spare length of 2.5 mm, an evaluation length of 12.5 mm, a tip radius of a probe of 2 μm, a tip angle of 60°, and a measurement speed of 0.5 mm/s. The measurement is performed in an environment of a temperature of 23° C. and a humidity of 30 RH %.

For measurement of the maximum height roughness Ry at the thickest portion, a measurement sample (15 cm in length×15 cm in width) is cut out from the interlayer film for a laminated glass, and the measurement is performed at three points on a line passing through the measurement point at the thickest portion and parallel to the extruding direction on the first surface and the second surface, respectively. The same operation is performed on all the measurement samples cut out for the evaluation, and the average of the obtained Ry values is calculated.

How to measure the parallel light transmittance Tp of the laminate after the preliminary pressure bonding is specifically described.

First, an interlayer film for a laminated glass is cut out to a size of 15 cm in length×15 cm in width as a measurement sample. In measurement at the thickest portion, the measurement sample is cut out from the interlayer film for a laminated glass in such a manner that the line passing through the thickness measurement point at the thickest portion and parallel to the extruding direction is made to pass through the center of the sample (15 cm in length×15 cm in width) (FIGS. 3(a) and 3(b)). In measurement at the thinnest portion, the measurement sample is cut out from the interlayer film for a laminated glass in such a manner that the line passing through the thickness measurement point at the thinnest portion and parallel to the extruding direction is made to pass through the center of the sample (15 cm in length×15 cm in width). In the case where the thickest portion and thinnest portion are each at a position within 7.5 cm from the end portion of the film, the sample is cut out from the interlayer film for a laminated glass in such a manner that the sample includes the end portion of the film as a side (FIG. 3(c)).

Next, the obtained piece of the interlayer film for a laminated glass as the measurement sample is sandwiched between two clear glass plates (15 cm in length×15 cm in width×2.5 mm in thickness), and interlayer film portions protruding from the laminate are cut, thereby preparing a laminate. The obtained laminate is pre-heated in an oven until the surface temperature of the glass reaches 30° C. The resulting laminate is placed in a rubber bag, which is then connected to a vacuum suction device. The rubber bag is heated so that the surface temperature of the laminate (preliminary pressure bonding temperature) reaches 90° C. in 14 minutes, while being held under a reduced pressure of −600 mmHg. Thereafter, the laminate is cooled until the surface temperature of the glass reaches 40° C., and the pressure is returned to atmospheric pressure. Thus, the preliminary pressure bonding is completed.

The parallel light transmittance of the laminate after preliminary pressure bonding is evaluated by the following method.

Specifically, the parallel light transmittance Tp (%) of the laminate after preliminary pressure bonding is measured using a haze meter (e.g., HM-150 available from Murakami Color Research Laboratory) in conformity with JIS K 7105.

The measurement is performed at five points including the central portion at which two diagonal lines of the laminate cross each other and four points at 5.64 cm from the respective corners of the laminate in the diagonal direction, and the average of the obtained values is taken as Tp.

The measurement is performed on a sample cut out from the laminate to have a size of 5 cm×5 cm or larger with the measurement point positioned at the center (FIG. 4).

How to measure the sealing temperature is specifically described.

The interlayer film for a laminated glass is sandwiched between two clear glass plates (15 cm in length×15 cm in width×2.5 mm in thickness), and interlayer film portions protruding from the laminate are cut, thereby preparing a laminated glass structure (laminate). The obtained laminated glass structure (laminate) is pre-heated in an oven preliminarily heated to 50° C. for 10 minutes. The resulting laminated glass structure (laminate) is placed in a rubber bag preliminarily heated to 50° C., which is then connected to a vacuum suction device. The rubber bag is held under a reduced pressure of −600 mmHg for five minutes, while the temperature of the laminated glass structure (laminate) (preliminary pressure bonding temperature) is maintained at 50° C., and the pressure is returned to atmospheric pressure. Thus, a preliminary pressure-bonded laminate is obtained.

The preliminarily pressure-bonded laminated glass structure (laminate) is placed in an autoclave. After the pressure is increased to 13 atm (1,300 kpa), the temperature is increased to 140° C. and kept for 20 minutes. Then, the temperature is lowered to 50° C., and the pressure is returned to atmospheric pressure. Thus, the final pressure bonding is completed, thereby producing a laminated glass.

The obtained laminated glass is stored at 23° C. for 24 hours after the final pressure bonding, and then heated in an oven at 140° C. for two hours. The resulting laminated glass is taken out from the oven and left to stand at 23° C. for 24 hours. The appearance of the laminated glass is then visually observed. The observation is performed on five sheets of the laminated glass.

The number of laminated glass sheets in which bubbles are observed at a position of 1 cm or more from the end portion is checked, and the deaeration properties are evaluated based on the following criteria.

o (Good): The number of laminated glass sheets including bubbles is 3 or less.

x (Poor): The number of laminated glass sheets including bubbles is more than 3.

The same evaluation is repeated while the pre-heating temperature of the laminated glass structure and the rubber bag temperature are increased in increments of 5° C. from 50° C., and the lowest temperature at which the deaeration properties are evaluated as ○ (Good) is taken as the sealing temperature.

Based on the obtained sealing temperature, the sealing properties in production of a laminated glass using the interlayer film for a laminated glass is evaluated based on the following criteria.

○ (Good): Sealing temperature is 75° C. or lower.
x (Poor): Sealing temperature is higher than 75° C.

In the case where the recesses on the surface of the interlayer film for a laminated glass of the present invention have a groove shape with a continuous bottom and the recesses adjacent to each other are regularly formed in parallel to each other, the interval Sm between the recesses is preferably 100 μm or larger, more preferably 200 μm or larger, and preferably 600 μm or smaller, more preferably 450 μm or smaller, still more preferably 300 μm or smaller. With the interval Sm of the recesses within this range, excellent deaeration properties can be exhibited.

The interval Sm of the recesses herein is measured by the method in conformity with JIS B-0601 (1994). The measurement is performed in a direction perpendicular to the groove shape with a continuous bottom or, in the case where the recesses are formed by embossing utilizing melt fracture, in a direction parallel to the extruding direction. The measurement is performed under the conditions of a cut-off value of 2.5 mm, a reference length of 2.5 mm, a spare length of 2.5 mm, an evaluation length of 12.5 mm, a tip radius of a probe of 2 μm, a tip angle of 60°, and a measurement speed of 0.5 mm/s. The measurement is performed in an environment of a temperature of 23° C. and a humidity of 30 RH %.

For measurement of the interval Sm of the recesses, a measurement sample (15 cm in length×15 cm in width) is cut out from the interlayer film for a laminated glass, and the measurement is performed along the line passing through the measurement point at the thickest portion and parallel to the extruding direction on the first surface and the second surface, respectively. The same operation is performed on all the measurement samples cut out for the evaluation, and the average of the obtained Sm values is calculated.

The lower limit of the maximum roughness (Ry) of the recesses is preferably 20 μm, more preferably 30 μm, still more preferably 40 μm. The upper limit of the maximum roughness of the recesses is preferably 80 μm, more preferably 65 μm. The groove depth (Ry) of the recesses set within the above range can further improve the deaeration properties in preliminary pressure bonding and final pressure bonding.

The groove depth (Ry) of the recesses as used herein is defined in "Surface Roughness—Definitions and Designation", JIS B-0601 (1994). The maximum roughness (Ry) of the recesses is readily obtained by data processing of the digital signals measured with a surface profilometer ("SE1700α" available from Kosaka Laboratory Ltd.).

The interlayer film for a laminated glass of the present invention preferably contains a thermoplastic resin.

Examples of the thermoplastic resin include polyvinylidene fluoride, polytetrafluoroethylene, vinylidene fluoride-propylene hexafluoride copolymers, polyethylene trifluoride, acrylonitrile-butadiene-styrene copolymers, polyesters, polyethers, polyamides, polycarbonates, polyacrylates, polymethacrylates, polyvinyl chloride, polyethylene, polypropylene, polystyrene, polyvinyl acetals, and ethylene-vinyl acetate copolymers. Preferred among these are polyvinyl acetals or ethylene-vinyl acetate copolymers, and more preferred are polyvinyl acetals.

The polyvinyl acetal can be prepared by acetalizing polyvinyl alcohol with an aldehyde. The polyvinyl alcohol can be prepared by saponifying polyvinyl acetate, for example. The degree of saponification of the polyvinyl alcohol is commonly within a range of 70 to 99.8 mol %.

The average degree of polymerization of the polyvinyl alcohol is preferably 200 or higher, more preferably 500 or higher, still more preferably 1,700 or higher, particularly preferably higher than 1,700, and preferably 5,000 or lower, more preferably 4,000 or lower, still more preferably 3,000 or lower, particularly preferably lower than 3,000. When the average degree of polymerization is equal to or higher than the lower limit, the penetration resistance of the laminated glass is further enhanced. When the average degree of polymerization is equal to or lower than the upper limit, molding of the interlayer film is facilitated.

The average degree of polymerization of the polyvinyl alcohol is obtained by the method in conformity with "Testing methods for polyvinyl alcohol", JIS K6726.

The carbon number of an acetal group in the polyvinyl acetal is not particularly limited. The aldehyde used for preparation of the polyvinyl acetal is not particularly limited. The lower limit of the carbon number of the acetal group in the polyvinyl acetal is preferably 3, and the upper limit thereof is preferably 6. When the carbon number of an acetal group in the polyvinyl acetal is 3 or more, the glass transition temperature of the interlayer film is sufficiently lowered and bleeding of the plasticizer can be prevented. When the carbon number of the aldehyde is 6 or less, synthesis of the polyvinyl acetal is facilitated, ensuring the productivity. The C3-C6 aldehyde may be a linear or branched aldehyde, and examples thereof include n-butyraldehyde and n-valeraldehyde.

The aldehyde is not particularly limited. Commonly, the aldehyde is preferably a C1-C10 aldehyde. Examples of the C1-C10 aldehyde include propionaldehyde, n-butyraldehyde, isobutyraldehyde, n-valeraldehyde, 2-ethylbutyraldehyde, n-hexylaldehyde, n-octylaldehyde, n-nonylaldehyde, n-decylaldehyde, formaldehyde, acetaldehyde, and benzaldehyde. Among these, preferred is propionaldehyde, n-butyraldehyde, isobutyraldehyde, n-hexyl aldehyde, or n-valeraldehyde, more preferred is propionaldehyde, n-butyraldehyde, or isobutyraldehyde, and still more preferred is n-butyraldehyde. One aldehyde may be used alone, or two or more aldehydes may be used in combination.

The content rate of hydroxy groups (hydroxy group content) of the polyvinyl acetal is preferably 10 mol % or higher, more preferably 15 mol % or higher, still more preferably 18 mol % or higher, and preferably 40 mol % or lower, more preferably 35 mol % or lower. When the content rate of hydroxy groups is equal to or higher than the lower limit, the adhesion force of the interlayer film is further enhanced. When the content rate of hydroxy groups is equal to or lower than the upper limit, the flexibility of the interlayer film is improved to facilitate handling of the interlayer film.

The content rate of hydroxy groups of the polyvinyl acetal is a value in percentage of the mole fraction obtained by dividing the amount of ethylene groups to which hydroxy groups are bonded by the amount of all the ethylene groups in the main chain. The amount of ethylene groups to which hydroxy groups are bonded can be determined by measurement in conformity with "Testing methods for polyvinyl alcohol", JIS K6726 or in conformity with ASTM D1396-92.

The degree of acetylation (acetyl group content) of the polyvinyl acetal is preferably 0.1 mol % or higher, more preferably 0.3 mol % or higher, still more preferably 0.5 mol % or higher, and preferably 30 mol % or lower, more preferably 25 mol % or lower, still more preferably 20 mol % or lower. When the degree of acetylation is equal to or higher than the lower limit, the compatibility between the polyvinyl acetal and the plasticizer is enhanced. When the degree of acetylation is equal to or lower than the upper limit, the moisture resistance of the interlayer film and the laminated glass is improved.

The degree of acetylation is a value in percentage of the mole fraction obtained by subtracting the amount of ethylene groups to which acetal groups are bonded and the amount of ethylene groups to which hydroxy groups are bonded from the amount of all the ethylene groups in the main chain and dividing the resulting value by the amount of all the ethylene groups in the main chain. The amount of ethylene groups to which acetal groups are bonded can be measured in conformity with "Testing methods for polyvinyl butyral", JIS K6728 or in conformity with ASTM D1396-92.

The degree of acetalization of the polyvinyl acetal (degree of butyralization in the case of polyvinyl butyral) is preferably 50 mol % or higher, more preferably 53 mol % or higher, still more preferably 60 mol % or higher, particularly preferably 63 mol % or higher, and preferably 85 mol % or lower, more preferably 75 mol % or lower, still more preferably 70 mol % or lower. When the degree of acetalization is equal to or higher than the lower limit, the compatibility between the polyvinyl acetal and the plasticizer is enhanced. When the degree of acetalization is equal to or lower than the upper limit, the reaction time needed for producing the polyvinyl acetal is reduced.

The degree of acetalization is a value in percentage of the mole fraction obtained by dividing the amount of ethylene groups to which acetal groups are bonded by the amount of all the ethylene groups in the main chain.

The degree of acetalization is obtainable by measuring the degree of acetylation and the content rate of hydroxy groups by a method in conformity with "Testing methods for polyvinyl butyral", JIS K6728 or in conformity with ASTM D1396-92, calculating the mole fractions based on the measurement results, and subtracting the mole fractions corresponding to the degree of acetylation and the content rate of hydroxy groups from 100 mol %.

The interlayer film for a laminated glass of the present invention preferably contains a plasticizer.

Any plasticizer that is commonly used for an interlayer film for a laminated glass may be used. Examples thereof include organic plasticizers such as monobasic organic acid esters and polybasic organic acid esters and phosphoric acid plasticizers such as organophosphate compounds and organophosphite compounds.

Examples of the organic plasticizers include triethylene glycol-di-2-ethylhexanoate, triethylene glycol-di-2-ethylbutyrate, triethylene glycol-di-n-heptanoate, tetraethylene glycol-di-2-ethylhexanoate, tetraethylene glycol-di-2-ethylbutyrate, tetraethylene glycol-di-n-heptanoate, diethylene glycol-di-2-ethylhexanoate, diethylene glycol-di-2-ethylbutyrate, and diethylene glycol-di-n-heptanoate. Preferred among these is triethylene glycol-di-2-ethylhexanoate, triethylene glycol-di-2-ethylbutyrate, or triethylene glycol-di-n-heptanoate, and more preferred is triethylene glycol-di-2-ethylhexanoate.

The amount of the plasticizer is not particularly limited. The lower limit of the amount is preferably 25 parts by mass, more preferably 30 parts by mass, and the upper limit thereof is preferably 80 parts by mass, more preferably 70 parts by mass, relative to 100 parts by mass of the thermoplastic resin. When the amount of the plasticizer is equal to or more than the lower limit, the penetration resistance of the laminated glass is further enhanced. When the amount of the plasticizer is equal to or less than the upper limit, the transparency of the interlayer film is further improved.

The interlayer film for a laminated glass of the present invention preferably contains an adhesion modifier.

As the adhesion modifier, an alkali metal salt or an alkaline earth metal salt is preferably used. Examples of the adhesion modifier include salts of potassium, sodium, magnesium, and the like.

Examples of the acid constituting the salts include organic acids such as carboxylic acids (e.g., octylic acid, hexylic acid, 2-ethylbutyric acid, butyric acid, acetic acid, formic acid) and inorganic acids such as hydrochloric acid and nitric acid.

The interlayer film for a laminated glass of the present invention may optionally contain additives such as an antioxidant, a light stabilizer, a modified silicone oil as an adhesion modifier, a flame retardant, an antistatic agent, a damp proofing agents, a heat reflector, a heat absorber, an antiblocking agent, an antistatic agent, a colorant including a pigment or dye.

The interlayer film for a laminated glass of the present invention may consist of a single resin layer or have a laminated structure including two or more resin layers stacked in the thickness direction. In the case of the laminated structure including two or more resin layers, the interlayer film for a laminated glass tends to have a larger total thickness. The thickness at the thickest portion is likely to be 850 μm or more. The effect of the present invention is exerted in such a thick interlayer film for a laminated glass.

Preferably, the interlayer film for a laminated glass of the present invention includes, as two or more resin layers, at least a first resin layer and a second resin layer, and the polyvinyl acetal contained in the first resin layer (hereafter, also referred to as polyvinyl acetal A) and the polyvinyl acetal contained in the second resin layer (hereafter, also referred to as polyvinyl acetal B) are different in the hydroxy group content.

Due to different characteristics of the polyvinyl acetal A and the polyvinyl acetal B, an interlayer film for a laminated glass to be provided can have various properties which are hardly achieved by a single layer structure. For example, in the case where the first resin layer is interposed between two second resin layers and the polyvinyl acetal A has a lower hydroxy group content than the polyvinyl acetal B, the first resin layer tends to have a lower glass transition temperature than the second resin layer. As a result, the first resin layer is softer than the second resin layer, leading to higher sound insulation properties of the interlayer film for a laminated glass. In the case where the first resin layer is interposed between two second resin layers and the polyvinyl acetal A has a higher hydroxy group content than the polyvinyl acetal B, the first resin layer tends to have a higher glass transition temperature than the second resin layer. As a result, the first resin layer is harder than the second resin layer, leading to higher penetration resistance of the interlayer film for a laminated glass.

In the case where the first resin layer and the second resin layer each contain a plasticizer, the amount of the plasticizer in the first resin layer relative to 100 parts by mass of the polyvinyl acetal (hereafter, referred to as amount A) is preferably different from the amount of the plasticizer in the second resin layer relative to 100 parts by mass of the polyvinyl acetal (hereafter, referred to as amount B). For example, in the case where the first resin layer is interposed between two second resin layers and the amount A is greater than the amount B, the first resin layer tends to have a lower glass transition temperature than the second resin layer. As a result, the first resin layer is softer than the second resin layer, leading to higher sound insulation properties of the interlayer film for a laminated glass. In the case where the first resin layer is interposed between two second resin layers and the amount A is smaller than the amount B, the first resin layer tends to have a higher glass transition temperature than the second resin layer. As a result, the first resin layer is harder than the second resin layer, leading to higher penetration resistance of the interlayer film for a laminated glass.

Exemplary combinations of two or more resin layers included in the interlayer film for a laminated glass of the present invention include a combination of a sound insulation layer as the first resin layer and a protective layer as the second resin layer for the purpose of improving the sound insulation properties of the laminated glass. For better sound insulation properties of the laminated glass, preferably, the sound insulation layer contains polyvinyl acetal X and a plasticizer and the protective layer contains polyvinyl acetal Y and a plasticizer. Moreover, in the case where the sound insulation layer is interposed between two protective layers, the interlayer film for a laminated glass to be obtained has excellent sound insulation properties (hereafter, also referred to as sound insulation interlayer film).

The sound insulation interlayer film is more specifically described in the following.

In the sound insulation interlayer film, the sound insulation layer provides sound insulation properties. The sound insulation layer preferably contains polyvinyl acetal X and a plasticizer.

The polyvinyl acetal X can be prepared by acetalizing polyvinyl alcohol with an aldehyde. The polyvinyl alcohol is commonly prepared by saponifying polyvinyl acetate.

The lower limit of the average degree of polymerization of the polyvinyl alcohol is preferably 200 and the upper limit thereof is preferably 5,000. When the average degree of polymerization of the polyvinyl alcohol is 200 or more, the penetration resistance of the sound insulation interlayer film to be obtained is enhanced. When the average degree of polymerization of the polyvinyl alcohol is 5,000 or less, the moldability of the sound insulation layer can be ensured. The lower limit of the average degree of polymerization of the polyvinyl alcohol is more preferably 500 and the upper limit thereof is more preferably 4,000.

The average degree of polymerization of the polyvinyl alcohol can be obtained by a method in conformity with "Testing methods for polyvinyl alcohol", JIS K6726.

The lower limit of the carbon number of the aldehyde used for acetalizing the polyvinyl alcohol is preferably 4 and the upper limit thereof is preferably 6. When the carbon number of the aldehyde is 4 or more, the sound insulation layer can stably contain a sufficient amount of plasticizer to exhibit excellent sound insulation properties. In addition, bleeding of a plasticizer can be prevented. When the carbon number of the aldehyde is 6 or less, synthesis of the polyvinyl acetal X is facilitated to ensure the productivity. The C4-C6 aldehyde may be a linear or branched aldehyde, and examples thereof include n-butyraldehyde and n-valeraldehyde.

The upper limit of the hydroxy group content of the polyvinyl acetal X is preferably 30 mol %. When the hydroxy group content of the polyvinyl acetal X is 30 mol % or less, the sound insulation layer can contain a plasticizer in an amount needed for exhibiting sound insulation properties. In addition, bleeding of a plasticizer can be prevented. The upper limit of the hydroxy group content of the polyvinyl acetal X is more preferably 28 mol %, still more preferably 26 mol %, particularly preferably 24 mol %, and the lower limit thereof is preferably 10 mol %, more preferably 15 mol %, still more preferably 20 mol %. The hydroxy group content of the polyvinyl acetal X is a value in percentage of the mole fraction obtained by dividing the amount of ethylene groups to which hydroxy groups are bonded by the amount of all the ethylene groups in the main chain. The amount of ethylene groups to which hydroxy groups are bonded can be determined by measuring the amount of ethylene groups to which hydroxy groups are bonded in the polyvinyl acetal X by a method in conformity with "Testing methods for polyvinyl butyral", JIS K6728.

The lower limit of the acetal group content of the polyvinyl acetal X is preferably 60 mol % and the upper limit thereof is preferably 85 mol %. When the acetal group content of the polyvinyl acetal X is 60 mol % or more, the sound insulation layer has higher hydrophobicity to be able to contain a plasticizer in an amount needed for exhibiting sound insulation properties, and bleeding of the plasticizer or whitening can be prevented. When the acetal group content of the polyvinyl acetal X is 85 mol % or less, synthesis of the polyvinyl acetal X is facilitated to ensure the productivity. The lower limit of the acetal group content of the polyvinyl acetal X is more preferably 65 mol %, still more preferably 68 mol % or more.

The acetal group content can be obtained by measuring the amount of ethylene groups to which acetal groups are bonded in the polyvinyl acetal X by a method in conformity with "Testing methods for polyvinyl butyral", JIS K 6728.

The lower limit of the acetyl group content of the polyvinyl acetal X is preferably 0.1 mol % and the upper limit thereof is preferably 30 mol %. When the acetyl group content of the polyvinyl acetal X is 0.1 mol % or more, the plasticizer can be contained in an amount needed for exhibiting sound insulation properties, and bleeding of the plasticizer can be prevented. When the acetyl group content of the polyvinyl acetal X is 30 mol % or less, the sound insulation layer has higher hydrophobicity to prevent whitening. The lower limit of the acetyl group content is more preferably 1 mol %, still more preferably 5 mol %, particularly preferably 8 mol %, and the upper limit thereof is more preferably 25 mol %, still more preferably 20 mol %. The acetyl group content is a value in percentage (mol %) of the mole fraction obtained by subtracting the amount of ethylene groups to which acetal groups are bonded and the amount of ethylene groups to which hydroxy groups are bonded from the amount of all the ethylene groups in the main chain and dividing the resulting value by the amount of all the ethylene groups in the main chain.

The polyvinyl acetal X is especially preferably a polyvinyl acetal with the acetyl group content of 8 mol % or more or a polyvinyl acetal with the acetyl group content of less than 8 mol % and the acetal group content of 65 mol % or more. In this case, the sound insulation layer can readily contain the plasticizer in an amount needed for exhibiting sound insulation properties. The polyvinyl acetal X is more preferably a polyvinyl acetal having the acetyl group content of 8 mol % or more or a polyvinyl acetal having the acetyl group content of less than 8 mol % and the acetal group content of 68 mol % or more.

The lower limit of the amount of the plasticizer in the sound insulation layer is preferably 45 parts by mass and the upper limit thereof is preferably 80 parts by mass relative to 100 parts by mass of the polyvinyl acetal X. When the amount of the plasticizer is 45 parts by mass or more, high sound insulation properties can be exhibited. When the amount of the plasticizer is 80 parts by mass or less, reduction in the transparency or adhesiveness of the interlayer film for a laminated glass due to bleeding of the plasticizer can be prevented. The lower limit of the amount of the plasticizer is more preferably 50 parts by mass, still more preferably 55 parts by mass, and the upper limit thereof is more preferably 75 parts by mass, still more preferably 70 parts by mass.

In the case where the sound insulation layer has a rectangular cross section in the thickness direction, the lower limit of the thickness is preferably 50 µm. The sound insulation layer with a thickness of 50 µm or more can exhibit sufficient sound insulation properties. The lower limit of the thickness of the sound insulation layer is more preferably 80 µm. The upper limit of the thickness of the sound insulation layer is not particularly limited. In consideration of the thickness as an interlayer film for a laminated glass, the upper limit is preferably 300 µm.

The sound insulation layer has one end and the other end that is an opposite end of the one end, and the other end may be thicker than the one end. The sound insulation layer preferably has a wedge-shaped portion in the cross section in the thickness direction. In such a case, the lower limit of the minimum thickness of the sound insulation layer is preferably 50 µm. The sound insulation layer having a minimum thickness of 50 µm or more can exhibit sufficient sound insulation properties. The lower limit of the minimum thickness of the sound insulation layer is more preferably 80 µm, still more preferably 100 µm. The upper limit of the maximum thickness of the sound insulation layer is not particularly limited. In consideration of the thickness as an interlayer film for a laminated glass, the upper limit is preferably 300 µm. The upper limit of the maximum thickness of the sound insulation layer is more preferably 220 µm.

The protective layer prevents reduction in the adhesiveness between the interlayer film for a laminated glass and glass due to bleeding of the plasticizer contained in a large amount in the sound insulation layer, and also imparts penetration resistance to the interlayer film for a laminated glass.

The protective layer preferably contains polyvinyl acetal Y and a plasticizer, more preferably contains polyvinyl acetal Y having a higher hydroxy group content than polyvinyl acetal X and a plasticizer.

The polyvinyl acetal Y can be prepared by acetalizing polyvinyl alcohol with an aldehyde. The polyvinyl alcohol is commonly prepared by saponifying polyvinyl acetate.

The lower limit of the average degree of polymerization of the polyvinyl alcohol is preferably 200 and the upper limit thereof is preferably 5,000. When the average degree of polymerization of the polyvinyl alcohol is 200 or more, the penetration resistance of the interlayer film for a laminated glass can be enhanced. When the average degree of polymerization of the polyvinyl alcohol is 5,000 or less, moldability of the protective layer can be ensured. The lower limit of the average degree of polymerization of the polyvinyl alcohol is more preferably 500 and the upper limit thereof is more preferably 4,000.

The lower limit of the carbon number of the aldehyde used for acetalizing the polyvinyl alcohol is preferably 3 and the upper limit thereof is preferably 4. When the carbon number of the aldehyde is 3 or more, the penetration resistance of the interlayer film for a laminated glass is enhanced. When the carbon number of the aldehyde is 4 or less, the productivity of the polyvinyl acetal Y is improved.

The C3-C4 aldehyde may be a linear or branched aldehyde, and examples thereof include n-butyraldehyde.

The upper limit of the hydroxy group content of the polyvinyl acetal Y is preferably 33 mol % and the lower limit thereof is preferably 28 mol %. When the hydroxy group content of the polyvinyl acetal Y is 33 mol % or less, whitening of the interlayer film for a laminated glass can be prevented. When the hydroxy group content of the polyvinyl acetal Y is 28 mol % or more, the penetration resistance of the interlayer film for a laminated glass is enhanced.

The lower limit of the acetal group content of the polyvinyl acetal Y is preferably 60 mol % and the upper limit thereof is preferably 80 mol %. When the acetal group content is 60 mol % or more, the protective layer can contain a plasticizer in an amount needed for exhibiting sufficient penetration resistance. When the acetal group content is 80 mol % or less, the adhesion force between the protective layer and glass can be ensured. The lower limit of the acetal group content is more preferably 65 mol % and the upper limit thereof is more preferably 69 mol %.

The upper limit of the acetyl group content of the polyvinyl acetal Y is preferably 7 mol %. When the acetyl group content of the polyvinyl acetal Y is 7 mol % or less, the protective layer has higher hydrophobicity to prevent whitening. The upper limit of the acetyl group content is more preferably 2 mol % and the lower limit thereof is preferably 0.1 mol %. The hydroxy group contents, acetal group contents, and acetyl group contents of the polyvinyl acetals A, B, and Y can be measured by the same methods as those employed for the polyvinyl acetal X.

The lower limit of the amount of the plasticizer in the protective layer is preferably 20 parts by mass and the upper limit thereof is preferably 45 parts by mass, relative to 100 parts by mass of the polyvinyl acetal Y. When the amount of the plasticizer is 20 parts by mass or more, the penetration resistance can be ensured. When the amount of the plasticizer is 45 parts by mass or less, bleeding of the plasticizer can be prevented to prevent reduction in the transparency or adhesiveness of the interlayer film for a laminated glass. The lower limit of the amount of the plasticizer is more preferably 30 parts by mass, still more preferably 35 parts by mass, and the upper limit thereof is more preferably 43 parts by mass, still more preferably 41 parts by mass. For further improvement of the sound insulation properties of the laminated glass, the amount of the plasticizer in the protective layer is preferably smaller than the amount of the plasticizer in the sound insulation layer.

For further improvement of the sound insulation properties of the laminated glass, the hydroxy group content of the polyvinyl acetal Y is preferably higher than the hydroxy group content of the polyvinyl acetal X. The hydroxy group content of the polyvinyl acetal Y is higher than the hydroxy group content of the polyvinyl acetal X more preferably by 1 mol % or more, still more preferably by 5 mol % or more, particularly preferably by 8 mol % or more. Adjustment of the hydroxy group contents of the polyvinyl acetal X and the polyvinyl acetal Y enables control of the amounts of the plasticizer in the sound insulation layer and the protective layer, lowering the glass transition temperature of the sound insulation layer. As a result, the sound insulation properties of the laminated glass are further improved.

For further improvement of the sound insulation properties of the laminated glass, the amount of the plasticizer relative to 100 parts by mass of the polyvinyl acetal X in the sound insulation layer (hereafter, also referred to as amount X) is preferably larger than the amount of the plasticizer relative to 100 parts by mass of the polyvinyl acetal Y in the protective layer (hereafter, also referred to as amount Y). The amount X is larger than the amount Y more preferably by 5 parts by mass or more, still more preferably by 15 parts by mass or more, particularly preferably by 20 parts by mass or more. Adjustment of the amount X and the amount Y lowers the glass transition temperature of the sound insulation layer. As a result, the sound insulation properties of the laminated glass are further improved.

The protective layer may be adjusted to have any thickness with which the protective layer can fulfill its function. In the case where the protective layer has projections and recesses formed thereon, the protective layer is preferably thickened within a possible range so as to avoid transferring of the projections and recesses to the interface between the protective layer and the sound insulation layer directly in contact with the protective layer. Specifically, in the case where the protective layer has a rectangular cross section, the lower limit of the thickness of the protective layer is preferably 100 µm, more preferably 300 µm, still more preferably 400 µm, particularly preferably 450 µm. The upper limit of the thickness of the protective layer is not particularly limited. For ensuring the thickness of the sound insulation layer which enables achievement of sufficient sound insulation properties, the upper limit is practically around 500 µm.

The protective layer has one end and the other end that is an opposite end of the one end, and the other end may be thicker than the one end. The protective layer preferably has a wedge-shaped portion in the cross section in the thickness direction. The protective layer may be adjusted to have any thickness with which the protective layer can fulfill its function. In the case where the protective layer has projections and recesses formed thereon, the protective layer is preferably thickened within a possible range so as to avoid transferring of the projections and recesses to the interface between the protective layer and the sound insulation layer directly in contact with the protective layer. Specifically, the lower limit of the minimum thickness of the protective layer is preferably 100 µm, more preferably 300 µm, still more preferably 400 µm, particularly preferably 450 µm. The upper limit of the maximum thickness of the protective layer is not particularly limited. For ensuring the thickness of the sound insulation layer which enables achievement of sufficient sound insulation properties, the upper limit is practically around 1,000 µm, preferably 800 µm.

The interlayer film for a laminated glass of the present invention may have one end and the other end that is an opposite end of the one end. The one end and the other end are both end portions opposing to each other of the interlayer film. In the interlayer film for a laminated glass of the present invention, the other end is preferably thicker than the one end. Such a difference in thickness between the one end and the other end allows the laminated glass produced using the interlayer film for a laminated glass of the present invention to be suitably used as a head-up display, and also effectively prevents double images in use of the head-up display. The interlayer film for a laminated glass of the present invention may have a wedge-shaped cross section. In the case of the interlayer film for a laminated glass having a wedge-shaped cross section, the wedge angle θ of the wedge shape can be controlled depending on the angle to attach the laminated glass, so that images can be displayed on the head-up display without double image phenomenon. For further preventing double image phenomenon, the lower limit of the wedge angle θ is preferably 0.1 mrad, more preferably 0.2 mrad, still more preferably 0.3 mrad, and the upper limit thereof is preferably 1 mrad, more preferably 0.9 mrad. In the case where the interlayer film for a laminated glass having a wedge-shaped cross section is produced by, for example, extrusion molding a resin composition using an extruder, the interlayer film may be thinnest at a region slightly inside of the edge on a thinner side thereof (specifically, when the distance from one side to the other side is X, the region of 0X to 0.2X from the edge on the thinner side toward the inside) and thickest at a region slightly inside of the edge on a thicker side thereof (specifically, when the distance from one side to the other side is X, the region of 0X to 0.2X from the edge on the thicker side toward the inside). Herein, such a shape is included in the wedge shape.

In the case where the interlayer film for a laminated glass of the present invention has a wedge-shaped cross section, it may have a multilayer structure including a sound insulation layer and a protective layer. The entire interlayer film for a laminated glass may be controlled to have a wedge-shaped cross section with a certain wedge angle by stacking the protective layer on the sound insulation layer having a thickness within a certain range.

FIGS. 5 to 7 each illustrate a schematic view of an exemplary embodiment of the interlayer film for a laminated glass of the present invention having a wedge-shaped cross section. For convenience of illustration in FIGS. 5 to 7, the interlayer film for a laminated glass and each layer forming the interlayer film for a laminated glass are each illustrated to have a thicknesses and a wedge angle θ different from those of the actual one.

FIG. 5 illustrates a cross section of an interlayer film for a laminated glass 5 in the thickness direction. The interlayer film for a laminated glass 5 has a two-layer structure in which a protective layer 52 is stacked on one surface of the sound insulation layer 51. The use of the sound insulation layer 51 in the rectangular shape and the protective layer 52 in the shape of a wedge, triangle, or trapezoid allows the entire interlayer film for a laminated glass 5 to have a wedge shape with a wedge angle θ of 0.1 to 1 mrad.

FIG. 6 illustrates a cross section of an interlayer film for a laminated glass 6 in the thickness direction. The interlayer film for a laminated glass 6 has a three-layer structure in which a protective layer 62 and a protective layer 63 are respectively laminated on both surfaces of the sound insulation layer 61. The use of the sound insulation layer 61 and the protective layer 63 each in the rectangular shape with a constant thickness and the protective layer 62 in the shape of a wedge, triangle, or trapezoid allows the entire interlayer film for a laminated glass 6 to have a wedge shape with a wedge angle θ of 0.1 to 1 mrad.

FIG. 7 illustrates a cross section of an interlayer film for a laminated glass 7 in the thickness direction. The interlayer film for a laminated glass 7 has a three-layer structure in which a protective layer 72 and a protective layer 73 are respectively laminated on both surfaces of the sound insulation layer 71. The stacking of the protective layers 72 and 73 each in the wedge shape on the sound insulation layer 71 in the wedge shape allows the entire interlayer film for a laminated glass 7 to have a wedge shape with a wedge angle θ of 0.1 to 1 mrad.

The interlayer film for a laminated glass of the present invention may be produced by any method, and a conventionally known method may be employed. For example, a thermoplastic resin and other materials added according to need are kneaded together and molded into an interlayer film for a laminated glass. Preferably, extrusion molding is employed because it is suitable for continuous production.

In the present invention, a large number of recesses are formed on at least one surface of the interlayer film for a laminated glass, for example by an embossing roll method, a calender roll method, a profile extrusion method, or a melt fracture method. Preferred among these is an embossing roll method.

The present invention also encompasses a laminated glass including a pair of glass plates and the interlayer film for a laminated glass of the present invention interposed between the pair of glass plates.

The glass plates may be commonly used transparent plate glass. Examples thereof include inorganic glass such as float plate glass, polished plate glass, molded plate glass, wired glass, wire-reinforced plate glass, colored plate glass, heat-absorbing glass, heat-reflecting glass, and green glass. Also usable is UV light-shielding glass in which a UV light-shielding coat layer is formed on the surface of glass. Moreover, organic plastic plates such as polyethylene terephthalate, polycarbonate, or polyacrylate plates may also be used.

As the glass plates, two or more kinds of glass plates may be used. Exemplary cases thereof include a laminated glass in which the interlayer film for a laminated glass of the present invention is sandwiched between a transparent float plate glass and a colored glass plate such as green glass. Moreover, as the glass plates, two or more kinds of glass plates different in the thickness may be used.

Advantageous Effects of Invention

The present invention can provide an interlayer film for a laminated glass that can, even when having a thickness at a thickest portion of 850 μm or more, exhibit sufficient deaeration properties in production of a laminated glass to provide a laminated glass with high transparency, and a laminated glass produced using the interlayer film for a laminated glass.

DESCRIPTION OF EMBODIMENTS

Figure 1:
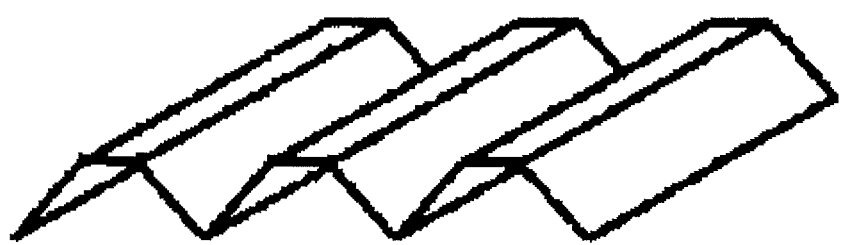
FIG. 1 is a schematic view illustrating an exemplary interlayer film for a laminated glass in which recesses having a groove shape with a continuous bottom formed on the surface are adjacent and parallel to each other at equal intervals.
Figure 2:
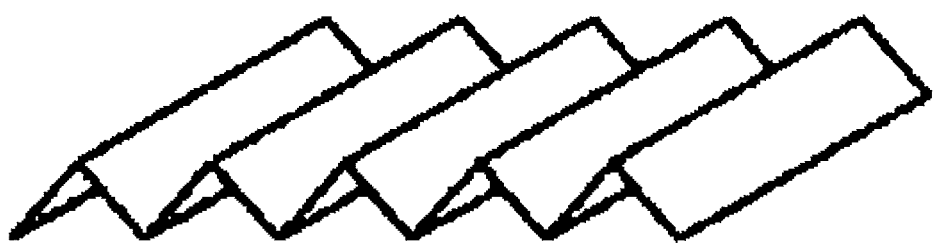
FIG. 2 is a schematic view illustrating an exemplary interlayer film for a laminated glass in which recesses having a groove shape with a continuous bottom formed on the surface are adjacent and parallel to each other at equal intervals.
Figure 3:
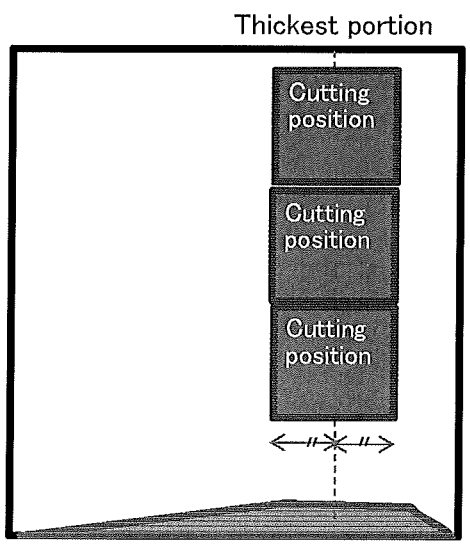
FIG. 3 is a schematic view explaining how to prepare measurement samples.
Figure 3:
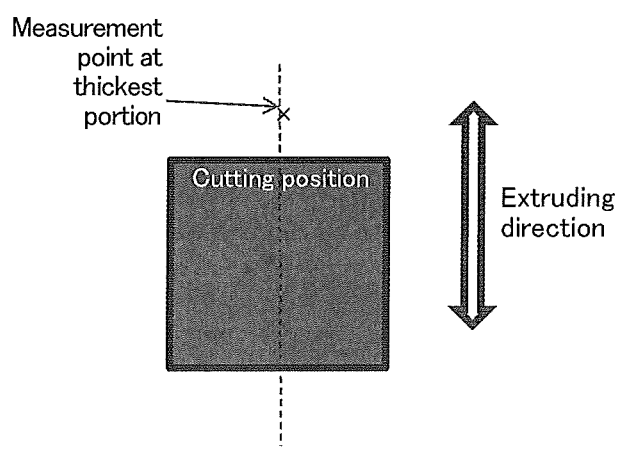
Figure 3:
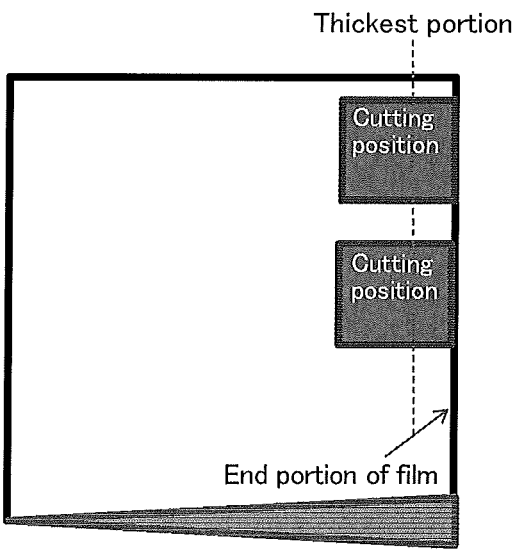
Figure 4:
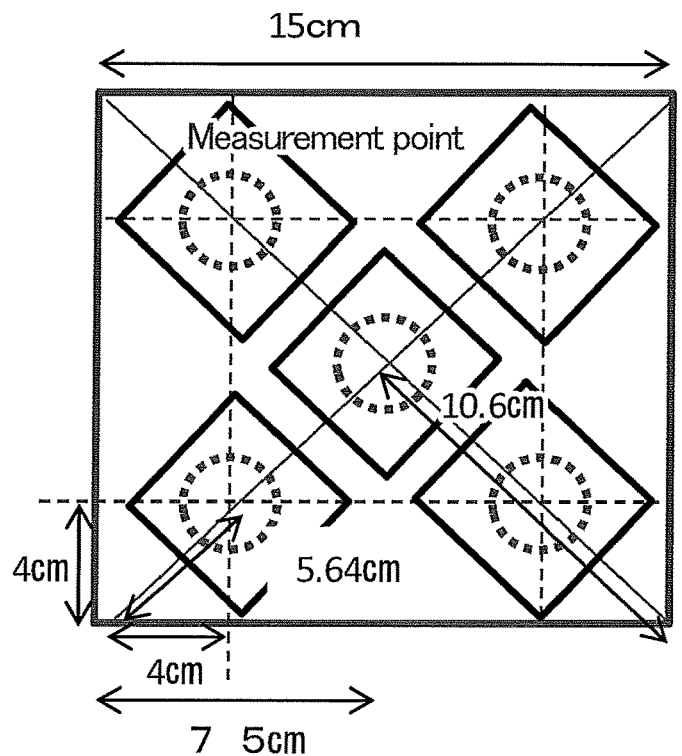
FIG. 4 is a schematic view explaining a position where parallel light transmittance is evaluated in a laminate after preliminary pressure bonding.
Figure 5:
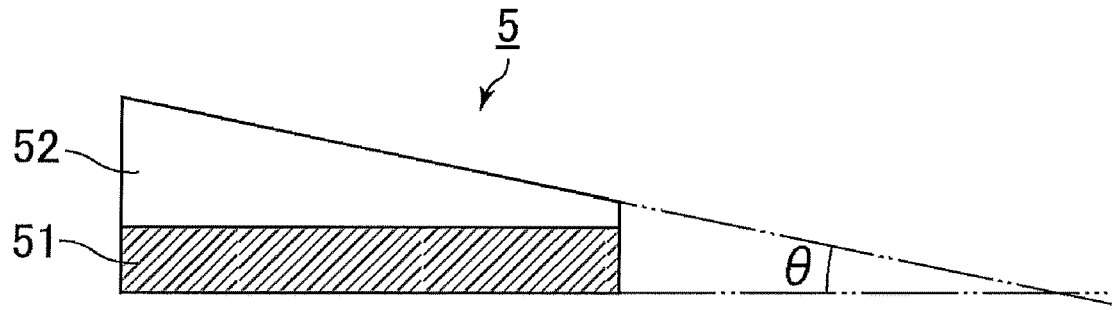
FIG. 5 is a schematic view explaining an exemplary embodiment of an interlayer film for a laminated glass having a wedge-shaped cross section.
Figure 6:
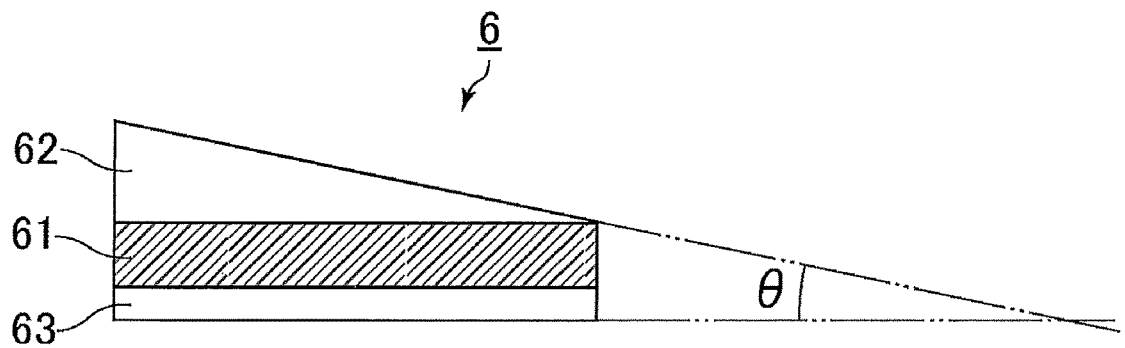
FIG. 6 is a schematic view explaining an exemplary embodiment of an interlayer film for a laminated glass having a wedge-shaped cross section.
Figure 7:
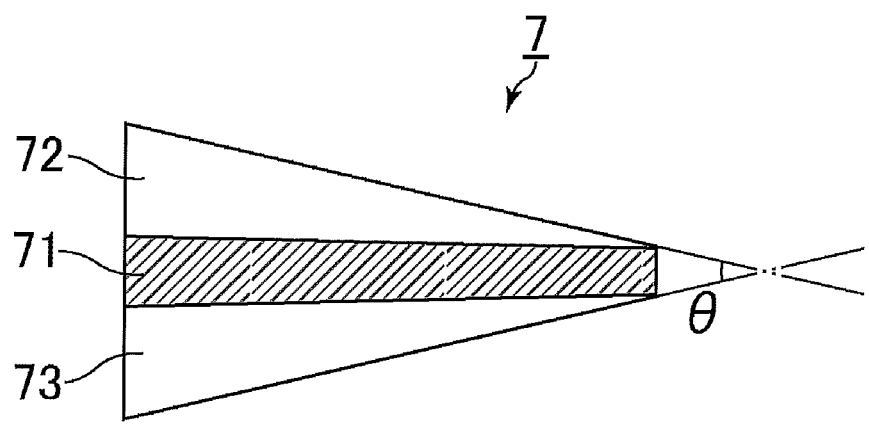
FIG. 7 is a schematic view explaining an exemplary embodiment of an interlayer film for a laminated glass having a wedge-shaped cross section.

Embodiments of the present invention are specifically described in the following with reference to, but not limited to, examples.

Example 1

(1) Preparation of Resin Composition

To 100 parts by mass of polyvinyl butyral (acetyl group content of 1 mol %, butyral group content of 69 mol %, hydroxy group content of 30 mol %) obtained by acetalizing polyvinyl alcohol (average degree of polymerization of 1,700) with n-butyraldehyde was added 40 parts by mass of triethylene glycol-di-2-ethylhexanoate (3GO) as a plasticizer. They were sufficiently kneaded with a mixing roll to prepare a resin composition.

(2) Production of Interlayer Film for a Laminated Glass

The obtained resin composition was extruded using an extruder into a single layer structure, thereby producing an interlayer film for a laminated glass having a rectangular cross section.

(3) Impartment of Recesses

In the first step, a random pattern of projections and recesses was transferred to both surfaces of the interlayer film for a laminated glass by the following process. First, random projections and recesses were formed on iron roll surfaces with an abrasive material, and the iron rolls were subjected to vertical grinding. Furthermore, by using a finer abrasive material, fine recesses and protrusions were formed on a flat portion formed after the grind In this manner, a pair of rolls in the same shape having a coarse main emboss pattern and a fine sub-emboss pattern were obtained. The pair of rolls was used as a device for transferring a pattern of projections and recesses to transfer a random pattern of projections and recesses to both surfaces of the obtained interlayer film for a laminated glass. The transferring was performed under the conditions of a temperature of the interlayer film for a laminated glass of 80° C., a temperature of the rolls of 145° C., a linear velocity of 10 m/min, and a linear pressure of 0 to 200 kN/m.

In the second step, projections and recesses having a groove shape with a continuous bottom (shape of an engraved line) were imparted to a surface of the interlayer film for a laminated glass by the following process. A pair of rolls including a metal roll having a surface milled with a triangular oblique line-type mill and a rubber roll having a JIS hardness of 45 to 75 was used as a device for transferring a pattern of projections and recesses. The obtained interlayer film for a laminated glass to which the random pattern of projections and recesses had been transferred in the first step was passed through the device for transferring a pattern of projections and recesses, whereby projections and recesses in which recesses having a groove shape with a continuous bottom (shape of an engraved line) were formed parallel to each other at equal intervals were imparted to a first surface of the interlayer film for a laminated glass. The transferring was performed under the conditions of a temperature of the interlayer film for a laminated glass of 80° C., a roll temperature of 140° C., a linear velocity of 10 m/min, and a pressure of 0 to 500 kPa.

The same treatment was performed on a second surface of the interlayer film for a laminated glass to impart recesses having a groove shape with a continuous bottom (shape of an engraved line). The thickness of the resulting interlayer film for a laminated glass was 870 μm.

Examples 2 to 27, Comparative Examples 1 and 2

An interlayer film for a laminated glass was produced in the same manner as in Example 1, except that the types of abrasive materials, the temperature of the interlayer film for a laminated glass, the temperature of the rolls, the linear velocity, the linear pressure, and the pressure employed in the first and second steps were adjusted in such a manner that Ry and Sm on the first surface and second surface had values as shown in Tables 1 to 4 and the interlayer film for a laminated glass after the impartment of recesses had a thickness as shown in Tables 1 to 4.

Example 28

(1) Preparation of Resin Composition

To 100 parts by mass of polyvinyl butyral (acetyl group content of 1 mol %, butyral group content of 69 mol %, hydroxy group content of 30 mol %) obtained by acetalizing polyvinyl alcohol (average degree of polymerization of 1,700) with n-butyraldehyde was added 40 parts by mass of triethylene glycol-di-2-ethylhexanoate (3GO) as a plasticizer. They were sufficiently kneaded with a mixing roll to prepare a resin composition.

(2) Production of Interlayer Film for a Laminated Glass and First Step of Impartment of Recesses The obtained resin composition was extruded using an extruder into a single layer structure, thereby producing an interlayer film for a laminated glass. At the same time, a pattern of projections and recesses were imparted to both surfaces of the interlayer film for a laminated glass. Specifically, concurrently with formation of an interlayer film for a laminated glass, a first shape was imparted to both surfaces of the film in an embossing method in which melt fracture was controlled under the conditions of the temperature of the resin composition at an inlet of a die of 150° C. to 270° C., the temperature of a lip die of 180° C. to 250° C. and a line speed of 10 m/min. The resulting interlayer film for a laminated glass had a thickness of 1,000 μm.

Comparative Example 3

An interlayer film for a laminated glass was produced in the same manner as in Example 28, except that the conditions for the embossing method in which melt fracture was controlled were adjusted in such a manner that Ry and Sm of the first and second surfaces had values as shown in Table 4 and the interlayer film for a laminated glass after the impartment of recesses had a thickness as shown in Table 4.

Example 29

An interlayer film for a laminated glass was produced in the same manner as in Example 1, except that the types of abrasive materials, the temperature of the interlayer film for a laminated glass, the temperature of the rolls, the linear velocity, the linear pressure, and the pressure employed in the first and second steps were adjusted in such a manner that Ry and Sm on the first surface and second surface had values as shown in Table 3 and the interlayer film for a laminated glass after the impartment of recesses had a thickness as shown in Table 3.

Example 30

The process up to the first step of the impartment of recesses was carried out in the same manner as in Example 28 to impart recesses to an interlayer film for a laminated glass. Then, to the surface of the interlayer film for a laminated glass to which the first shape had been imparted were imparted projections and recesses having a groove shape with a continuous bottom by the following procedure as the second step of the impartment of recesses. A pair of rolls including a metal roll having a surface milled with a triangular oblique line-type mill and a rubber roll having a JIS hardness of 45 to 75 was used as a device for transferring a pattern of projections and recesses. The interlayer film for a laminated glass to which the first shape had been imparted was passed through the device for transferring a pattern of projections and recesses, whereby projections and recesses in which recesses having a groove shape with a continuous bottom were formed parallel to each other at equal intervals were imparted to a first surface of the interlayer film for a laminated glass. The transferring was performed under the conditions of a temperature of the interlayer film for a laminated glass of 70° C., a roll temperature of 140° C., a linear velocity of 10 m/min, and a linear pressure of 1 to 100 kN/m. The same treatment was performed to a second surface of the interlayer film for a laminated glass to impart recesses having a groove shape with a continuous bottom. At that time, the recesses having a groove shape with a continuous bottom (shape of an engraved line) formed on the first surface and the recesses having a groove shape with a continuous bottom (shape of an engraved line) formed on the second surface were set to have an intersection angle of 20°. The resulting interlayer film for a laminated glass had a thickness of 1,000 μm.

Example 31

An interlayer film for a laminated glass was produced in the same manner as in Example 1, except that the types of abrasive materials, the temperature of the interlayer film for a laminated glass, the temperature of the rolls, the linear velocity, the linear pressure, and the pressure employed in the first and second steps were adjusted in such a manner that Ry and Sm on the first surface and second surface had values as shown in Table 4 and the interlayer film for a laminated glass after the impartment of recesses had a thickness as shown in Table 4.

Example 32

(1) Preparation of Resin Composition

To 100 parts by mass of polyvinyl butyral (acetyl group content of 1 mol %, butyral group content of 69 mol %, hydroxy group content of 30 mol %) obtained by acetalizing polyvinyl alcohol (average degree of polymerization of 1,700) with n-butyraldehyde was added 40 parts by mass of triethylene glycol-di-2-ethylhexanoate (3GO) as a plasticizer. They were sufficiently kneaded with a mixing roll to prepare a resin composition.

(2) Production of Interlayer Film for a Laminated Glass

The obtained resin composition was extruded using an extruder into a single layer structure, thereby producing an interlayer film for a laminated glass having a wedge-shaped cross section. The extrusion conditions were set in such a manner that the interlayer film for a laminated glass after the impartment of recesses had a thickness at the thickest portion of 1,240 µm and a thickness at the thinnest portion of 790 µm. In this process, the die temperature was adjusted to have a gradient within a range of 100° C. to 280° C. in such a manner that the temperature at the end portion on the thinner side of the entire interlayer film for a laminated glass was lower and the temperature at the end portion on the thicker side of the entire interlayer film was higher, and the lip die was adjusted to have a lip interval of 1.0 to 4.0 mm.

(3) Impartment of Recesses

In the first step, a random pattern of projections and recesses was transferred to both surfaces of the interlayer film for a laminated glass by the following process. First, random projections and recesses were formed on iron roll surfaces with an abrasive material, and the iron rolls were subjected to vertical grinding. Furthermore, by using a finer abrasive material, fine recesses and protrusions were formed on a flat portion formed after the grind. In this manner, a pair of rolls in the same shape having a coarse main emboss pattern and a fine sub-emboss pattern were obtained. The pair of rolls was used as a device for transferring a pattern of projections and recesses to transfer a random pattern of projections and recesses to both surfaces of the obtained interlayer film for a laminated glass. The transferring was performed under the conditions of a temperature of the interlayer film for a laminated glass of 80° C., a temperature of the rolls of 145° C., a linear velocity of 10 m/min, and a linear pressure of 0 to 200 kN/m.

In the second step, projections and recesses having a groove shape with a continuous bottom (shape of an engraved line) were imparted to a surface of the interlayer film for a laminated glass by the following process. A pair of rolls including a metal roll having a surface milled with a triangular oblique line-type mill and a rubber roll having a JIS hardness of 45 to 75 was used as a device for transferring a pattern of projections and recesses. The obtained interlayer film for a laminated glass to which the random pattern of projections and recesses had been transferred in the first step was passed through the device for transferring a pattern of projections and recesses, whereby projections and recesses in which recesses having a groove shape with a continuous bottom (shape of an engraved line) were formed parallel to each other at equal intervals were imparted to a first surface of the interlayer film for a laminated glass. The transferring was performed under the conditions of a temperature of the interlayer film for a laminated glass of 80° C., a roll temperature of 140° C., a linear velocity of 10 m/min, and a pressure of 0 to 500 kPa.

The same treatment was performed to a second surface of the interlayer film for a laminated glass to impart recesses having a groove shape with a continuous bottom (shape of an engraved line).

Examples 33 to 49, Comparative Examples 4 and 5

An interlayer film for a laminated glass was produced in the same manner as in Example 32, except that the types of abrasive materials, the temperature of the interlayer film for a laminated glass, the temperature of the rolls, the linear velocity, the linear pressure, and the pressure employed in the first and second steps were adjusted in such a manner that Ry and Sm on the first surface and second surface had values as shown in Tables 5 to 9 and the interlayer film for a laminated glass after the impartment of recesses had a thickness at the thickest portion and a thickness at the thinnest portion as shown in Tables 5 to 9.

Example 50

(1) Preparation of Resin Composition

To 100 parts by mass of polyvinyl butyral (acetyl group content of 1 mol %, butyral group content of 69 mol %, hydroxy group content of 30 mol %) obtained by acetalizing polyvinyl alcohol (average degree of polymerization of 1,700) with n-butyraldehyde was added 40 parts by mass of triethylene glycol-di-2-ethylhexanoate (3GO) as a plasticizer. They were sufficiently kneaded with a mixing roll to prepare a resin composition.

(2) Production of Interlayer Film for a Laminated Glass and First Step of Impartment of Recesses The obtained resin composition was extruded using an extruder into a single layer structure, thereby producing an interlayer film for a laminated glass having a wedge-shaped cross section. At the same time, a pattern of projections and recesses was imparted to both surfaces of the interlayer film for a laminated glass. The extrusion conditions were set in such a manner that the interlayer film for a laminated glass after the impartment of recesses had a thickness at the thickest portion of 1,270 µm and a thickness at the thinnest portion of 820 µm. In this process, the die temperature was adjusted to have a gradient within a range of 100° C. to 280° C. in such a manner that the temperature at the end portion on the thinner side of the entire interlayer film for a laminated glass was lower and the temperature at the end portion on the thicker side of the entire interlayer film was higher, the lip die was adjusted to have a lip interval of 1.0 to 4.0 mm, and the line speed was adjusted to 10 m/min.

Then, in the second step, to the surface of the interlayer film for a laminated glass to which the first shape had been imparted were imparted projections and recesses having a groove shape with a continuous bottom by the following procedure. A pair of rolls including a metal roll having a surface milled with a triangular oblique line-type mill and a rubber roll having a JIS hardness of 45 to 75 was used as a device for transferring a pattern of projections and recesses. The obtained interlayer film for a laminated glass to which the first shape had been imparted was passed through the device for transferring a pattern of projections and recesses, whereby projections and recesses in which recesses having a groove shape with a continuous bottom were formed parallel to each other at equal intervals were imparted to a first surface of the interlayer film for a laminated glass. The transferring was performed under the conditions of a temperature of the interlayer film for a laminated glass of 70° C., a roll temperature of 140° C., a linear velocity of 10 m/min, and a linear pressure of 1 to 100 kN/m. The same treatment was performed to a second surface of the interlayer film for a laminated glass to impart recesses having a groove shape with a continuous bottom. At that time, the recesses having a groove shape with a continuous bottom (shape of an engraved line) formed on the first surface and the recesses having a groove shape with a continuous bottom (shape of an engraved line) formed on the second surface were set to have an intersection angle of 20°.

Example 51

An interlayer film for a laminated glass was produced in the same manner as in Example 32, except that the types of abrasive materials, the temperature of the interlayer film for a laminated glass, the temperature of the rolls, the linear velocity, the linear pressure, and the pressure employed in the first and second steps were adjusted in such a manner that Ry and Sm on the first surface and second surface had values as shown in Table 9 and the interlayer film for a laminated glass after the impartment of recesses had a thickness at the thickest portion and a thickness at the thinnest portion as shown in Table 9.

Comparative Example 6

An interlayer film for a laminated glass was produced in the same manner as in Example 46, except that the conditions for the embossing method in which melt fracture was controlled were adjusted in such a manner that Ry and Sm on the first surface and second surface had values as shown in Table 9 and the interlayer film for a laminated glass after the impartment of recesses had a thickness as shown in Table 9 and that the second step of the impartment of recesses was not performed.

Example 52

(1) Preparation of Resin Composition for Protective Layers

To 100 parts by mass of polyvinyl butyral (acetyl group content of 1 mol %, butyral group content of 69 mol %, hydroxy group content of 30 mol %) obtained by acetalizing polyvinyl alcohol (average degree of polymerization of 1,700) with n-butyraldehyde was added 36 parts by mass of triethylene glycol-di-2-ethylhexanoate (3GO) as a plasticizer, and they were sufficiently kneaded with a mixing roll to prepare a resin composition for protective layers.

(2) Preparation of Resin Composition for Sound Insulation Layers

To 100 parts by mass of polyvinyl butyral (acetyl group content of 12 mol %, butyral group content of 66 mol %, hydroxy group content of 22 mol %) obtained by acetalizing polyvinyl alcohol (average degree of polymerization of 2,300) with n-butyraldehyde was added 78 parts by mass of triethylene glycol-di-2-ethylhexanoate (3GO) as a plasticizer, and they were sufficiently kneaded with a mixing roll to prepare a resin composition for sound insulation layers.

(3) Production of Interlayer Film for a Laminated Glass

The obtained resin composition for protective layers and resin composition for sound insulation layers were coextruded using a coextruder in such a manner that the resulting protective layer, sound insulation layer, protective layer, and entire interlayer film each have a cross-sectional shape, a maximum thickness, and a minimum thickness as shown in Table 10. Thus, an interlayer film for a laminated glass having a three layer structure in which a protective layer, a sound insulation layer, and a protective layer were stacked in the stated order was obtained.

In Table 10, the maximum thickness and the minimum thickness of the protective layer respectively refer to the total maximum thickness and the total minimum thickness of two protective layers.

(4) Impartment of Recesses

An interlayer film for a laminated glass was produced in the same manner as in Example 32, except that the types of abrasive materials, the temperature of the interlayer film for a laminated glass, the temperature of the rolls, the linear velocity, the linear pressure, and the pressure employed in the first and second steps were adjusted in such a manner that Ry and Sm on the first surface and second surface had values as shown in Table 10 and the interlayer film for a laminated glass after the impartment of recesses had a thickness at the thickest portion and a thickness at the thinnest portion as shown in Table 10.

The thickness of the sound insulation layer was measured by the following procedure. The total thickness of the protective layers was obtained by subtracting the thickness of the sound insulation layer from the thickness of the entire interlayer film. Specifically, the interlayer film for a laminated glass after the impartment of recesses was cut using a razor blade (Feather FAS-10 single-edged straight razor blade available from FEATHER Safety Razor Co., Ltd.) in a direction perpendicular to the thickness direction, and the cross section was observed with a microscope (DSX-100 available from Olympus Corporation). Using measurement software provided with the microscope, the distance between two interfaces between the respective protective layers and the sound insulation layer was measured, and the obtained value was taken as the thickness of the sound insulation layer. The measurement was performed in an environment of 23° C. and 30 RH %.

Examples 53 to 56, Comparative Example 7

An interlayer film for a laminated glass was produced in the same manner as in Example 52, except that the types of abrasive materials, the temperature of the interlayer film for a laminated glass, the temperature of the rolls, the linear velocity, the linear pressure, and the pressure employed in the first and second steps were adjusted in such a manner that the composition and amount of polyvinyl butyral and the composition and amount of the plasticizer used in the protective layers and sound insulation layer and Ry and Sm on the first surface and second surface had values as shown in Table 10 and the interlayer film for a laminated glass after the impartment of recesses had a thickness as shown in Table 10.

Evaluation

The interlayer films for a laminated glass obtained in the examples and comparative examples were evaluated by the following methods.

Tables 1 to 10 show the results.

(1) Preparation of Measurement Sample

Measurement samples were prepared by the following procedure using the interlayer films for a laminated glass having a wedge-shaped cross section in the thickness direction obtained in Examples 32 to 51 and Comparative Examples 4 to 6. Each interlayer film for a laminated glass was cut into a size of 15 cm in length and 15 cm in width as a measurement sample. For measurement at the thickest portion, the interlayer film for a laminated glass was cut into a size of 15 cm in length and 15 cm in width in such a manner that the line passing through the thickness measurement point at the thickest portion and parallel to the extruding direction was made to pass through the center of the resulting piece of the interlayer film for a laminated glass. For measurement at the thinnest portion, the interlayer film for a laminated glass was cut into a size of 15 cm in length and 15 cm in width in such a manner that the line passing through the thickness measurement point at the thinnest portion and parallel to the extruding direction was made to pass through the center of the resulting piece of the interlayer film for a laminated glass.

In the case where the thickest portion and thinnest portion are each at a position within 7.5 cm from the end portion of the film, the measurement sample was cut out from the interlayer film for a laminated glass in such a manner that the sample includes the end portion as a side.

The thickness T of the film was measured in conformity with JIS K-6732 (1996) with a constant pressure thickness gauge (FFD-2 available from OZAKI MFG. Co., Ltd.). The thickness was measured at 5-cm intervals from one end to the other end in a direction perpendicular to the extruding direction of the sample interlayer film for a laminated glass. The thickness at the thickest point was taken as the thickness T at the thickest portion.

The thickness of each of the measurement samples of the interlayer films for a laminated glass having a rectangular cross section in the thickness direction of Examples 1 to 31 and Comparative Examples 1 to 3 was measured in the same manner as in Examples 32 to 51 and Comparative Examples 4 to 6, except that the thickness was measured at 5-cm intervals from one end to the other end and the average of the measured thickness values was taken as the thickness of the film.

(2) Measurement of Maximum Height Roughness Ry at Thickest Portion

The maximum height roughness Ry at the thickest portion was measured in conformity with JIS B-0601 (1994). Specifically, the measurement was performed in a direction perpendicular to the groove shape with a continuous bottom or, in the case where the recesses were formed by embossing utilizing melt fracture, in a direction parallel to the extruding direction. The measurement was performed under the conditions of a cut-off value of 2.5 mm, a reference length of 2.5 mm, a spare length of 2.5 mm, an evaluation length of 12.5 mm, a tip radius of a probe of 2 µm, a tip angle of 60°, and a measurement speed of 0.5 mm/s.

The maximum height roughness Ry at the thickest portion was measured along the line passing through the measurement point at the thickest portion and parallel to the extruding direction on the first surface and the second surface, respectively. The same operation was performed on all the measurement samples cut out for the evaluation, and Ry(Ave) and Ry(Max) were calculated based on the obtained Ry values.

(3) Measurement of Interval Sm of Recesses

The interval Sm of the recesses was measured in conformity with JIS B-0601 (1994). Specifically, the measurement was performed in a direction perpendicular to the groove shape with a continuous bottom or, in the case where the recesses were formed by embossing utilizing melt fracture, in a direction parallel to the extruding direction. The measurement was performed under the conditions of a cut-off value of 2.5 mm, a reference length of 2.5 mm, a spare length of 2.5 mm, an evaluation length of 12.5 mm, a tip radius of a probe of 2 µm, a tip angle of 60°, and a measurement speed of 0.5 mm/s.

For measurement of the interval Sm of the recesses, a measurement sample (15 cm in length×15 cm in width) was cut out from the interlayer film for a laminated glass, and the measurement was performed along the line passing through the measurement point at the thickest portion and parallel to the extruding direction on the first surface and the second surface, respectively. The same operation was performed on all the measurement samples cut out for the evaluation, and the average (Sm(Ave)) of the obtained Sm values was calculated.

(4) Evaluation of Deaeration Properties in Production of Laminated Glass

The measurement sample of the interlayer film for a laminated glass was sandwiched between two clear glass plates (15 cm in length×15 cm in width×2.5 mm in thickness), and interlayer film portions protruding from the laminate were cut, thereby preparing a laminate. The obtained laminate was pre-heated in an oven until the surface temperature of the glass reached 30° C. The resulting laminate was placed in a rubber bag, which was then connected to a vacuum suction device. The rubber bag was heated so that the surface temperature (preliminary pressure bonding temperature) reached 90° C. in 14 minutes, while being held under a reduced pressure of −600 mmHg. Thereafter, the laminate was cooled until the surface temperature of the glass reached 40° C., and the pressure was returned to atmospheric pressure. Thus, the preliminary pressure bonding was completed.

Next, the parallel light transmittance of the laminate after preliminary pressure bonding was evaluated by the following method.

Specifically, the parallel light transmittance Tp (%) of the laminate after preliminary pressure bonding was measured using a haze meter (HM-150 available from Murakami Color Research Laboratory) in conformity with JIS K 7105.

The measurement was performed at five points including the central portion at which two diagonal lines of the laminate cross each other and four points at 5.64 cm from the respective corners of the laminate in the diagonal direction, and the average of the obtained values was taken as Tp. The measurement was performed on samples each cut out from the laminate to have a size of 5 cm×5 cm or larger with the measurement point positioned at the center.

Based on the obtained parallel light transmittance Tp, the deaeration properties in production of a laminated glass using the interlayer film for a laminated glass was evaluated based on the following criteria.
○ (Good): The parallel light transmittance Tp of the laminate after preliminary pressure bonding was 45% or higher.
x (Poor): The parallel light transmittance Tp of the laminate after preliminary pressure bonding was lower than 45%.

(5) Evaluation of Sealing Properties in Production of Laminated Glass

A measurement sample of the interlayer film for a laminated glass was sandwiched between two clear glass plates (15 cm in length×15 cm in width×2.5 mm in thickness), and interlayer film portions protruding from the laminate were cut, thereby preparing a laminated glass structure (laminate). The obtained laminated glass structure (laminate) was pre-heated in an oven preliminarily heated to 50° C. for 10 minutes. The resulting laminated glass structure (laminate) was placed in a rubber bag preliminarily heated to 50° C., which was then connected to a vacuum suction device. The rubber bag was held under a reduced pressure of −600 mmHg for five minutes, while the temperature of the laminated glass structure (laminate) (preliminary pressure bonding temperature) was maintained at 50° C., and the pressure was returned to atmospheric pressure. Thus, a preliminary pressure-bonded laminate was obtained.

The preliminarily pressure-bonded laminated glass structure (laminate) was placed in an autoclave. After the pressure was increased to 13 atm (1,300 kpa), the temperature was increased to 140° C. and kept for 20 minutes. Then, the temperature was lowered to 50° C., and the pressure was returned to atmospheric pressure. Thus, the final pressure bonding was completed, thereby producing a laminated glass.

The obtained laminated glass was stored at 23° C. for 24 hours after the final pressure bonding, and then heated in an oven at 140° C. for two hours. The resulting laminated glass was taken out from the oven and left to stand at 23° C. for 24 hours. The appearance of the laminated glass was then visually observed. The observation was performed on five sheets of the laminated glass.

The number of laminated glass sheets in which bubbles were observed at a position of 1 cm or more from the end portion was checked, and the deaeration properties were evaluated based on the following criteria.
○ (Good): The number of laminated glass sheets with bubbles is 3 or less.
× (Poor): The number of laminated glass sheets with bubbles is more than 3.

The same evaluation was repeated while the pre-heating temperature of the laminated glass structure and the rubber bag temperature were increased in increments of 5° C. from 50° C., and the lowest temperature at which the deaeration properties were evaluated as ○ (Good) was taken as the sealing temperature.

Based on the obtained sealing temperature, the sealing properties in production of a laminated glass using the interlayer film for a laminated glass was evaluated based on the following criteria.
○ (Good): Sealing temperature of 75° C. or lower.
× (Poor): Sealing temperature of higher than 75° C.

TABLE 1

| | | | | | Example 1 | Example 2 | Example 3 | Example 4 | Example 5 |
|---|---|---|---|---|---|---|---|---|---|
| Interlayer film for a laminated glass | Thickness | | | μm | 870 | 1300 | 1500 | 1550 | 1010 |
| | Recess | First surface | Ry | μm | 49 | 58 | 61 | 63 | 54 |
| | | | Sm | μm | 186 | 200 | 187 | 470 | 200 |
| | | Second surface | Ry | μm | 46 | 56 | 56 | 56 | 54 |
| | | | Sm | μm | 175 | 195 | 185 | 472 | 194 |
| | | Average | Ry(Ave) | μm | 48 | 57 | 59 | 60 | 54 |
| | | | Sm(Ave) | μm | 181 | 198 | 186 | 471 | 197 |
| | | | Ry(max) | μm | 49 | 58 | 61 | 63 | 54 |
| Shaping | First step | | | — | Shaping with rolls | Shaping with rolls | Shaping with rolls | Shaping with rolls | Shaping with rolls |
| | Second step | | | — | Rolling imparting engraved lines | Rolling imparting engraved lines | Rolling imparting engraved lines | Rolling imparting engraved lines | Rolling imparting engraved lines |
| Expression | Expression (1): Ry(Ave) ≥ 0.020 × T + 16.6 | | | — | ○ | ○ | ○ | ○ | ○ |
| | Expression (2): Ry(Ave) ≥ 0.025 × T + 14.0 | | | — | ○ | ○ | ○ | ○ | ○ |
| | Expression (3): Ry(Max) ≤ 0.0195 × T + 33.2 | | | — | ○ | ○ | ○ | ○ | X |
| | Expression (4): Ry(Max) ≤ 0.0159 × T + 32.2 | | | — | X | X | X | X | X |
| Evaluation | Deaeration properties in production of laminated glass | Parallel light transmittance Tp | | % | 67 | 64 | 55 | 52 | 70 |
| | | Judgement | | — | ○ | ○ | ○ | ○ | ○ |
| | Sealing properties in production of laminated glass | Sealing temperature | | ° C. | 75 | 75 | 75 | 75 | 80 |
| | | Judgement | | — | ○ | ○ | ○ | ○ | X |

| | | | | | Example 6 | Example 7 | Example 8 | Example 9 | Example 10 |
|---|---|---|---|---|---|---|---|---|---|
| Interlayer film for a laminated glass | Thickness | | | μm | 1450 | 860 | 1050 | 1240 | 1520 |
| | Recess | First surface | Ry | μm | 64 | 45 | 47 | 45 | 55 |
| | | | Sm | μm | 187 | 188 | 185 | 200 | 200 |
| | | Second surface | Ry | μm | 62 | 41 | 45 | 49 | 55 |
| | | | Sm | μm | 185 | 179 | 178 | 200 | 198 |
| | | Average | Ry(Ave) | μm | 63 | 43 | 46 | 47 | 55 |
| | | | Sm(Ave) | μm | 186 | 184 | 182 | 200 | 199 |
| | | | Ry(max) | μm | 64 | 45 | 47 | 50 | 55 |

TABLE 1-continued

| | | | | | | | | |
|---|---|---|---|---|---|---|---|---|
| Shaping | First step | | — | Shaping with rolls | Shaping with rolls | Shaping with rolls | Shaping with rolls | Shaping with rolls |
| | Second step | | — | Rolling imparting engraved lines | Rolling imparting engraved lines | Rolling imparting engraved lines | Rolling imparting engraved lines | Rolling imparting engraved lines |
| Expression | Expression (1): Ry(Ave) ≥ 0.020 × T + 16.6 | | — | ○ | ○ | ○ | ○ | ○ |
| | Expression (2): Ry(Ave) ≥ 0.025 × T + 14.0 | | — | ○ | ○ | ○ | ○ | ○ |
| | Expression (3): Ry(Max) ≤ 0.0195 × T + 33.2 | | — | X | ○ | ○ | ○ | ○ |
| | Expression (4): Ry(Max) ≤ 0.0159 × T + 32.2 | | — | X | ○ | ○ | ○ | ○ |
| Evaluation | Deaeration properties in production of laminated glass | Parallel light transmittance Tp | % | 68 | 62 | 60 | 54 | 53 |
| | | Judgement | — | ○ | ○ | ○ | ○ | ○ |
| | Sealing properties in production of laminated glass | Sealing temperature | °C. | 80 | 70 | 70 | 70 | 70 |
| | | Judgement | — | X | ○ | ○ | ○ | ○ |

TABLE 2

| | | | | | Example 11 | Example 12 | Example 13 | Example 14 | Example 15 |
|---|---|---|---|---|---|---|---|---|---|
| Interlayer film for a laminated glass | Thickness | | | μm | 1050 | 1420 | 900 | 1320 | 1550 |
| | Recess | First surface | Ry | μm | 50 | 57 | 35 | 45 | 50 |
| | | | Sm | μm | 200 | 187 | 186 | 200 | 201 |
| | | Second surface | Ry | μm | 48 | 56 | 36 | 44 | 48 |
| | | | Sm | μm | 189 | 185 | 175 | 195 | 198 |
| | | Average | Ry(Ave) | μm | 49 | 57 | 36 | 45 | 49 |
| | | | Sm(Ave) | μm | 188 | 186 | 181 | 198 | 200 |
| | | | Ry(max) | μm | 50 | 56 | 36 | 45 | 50 |
| Shaping | First step | | | — | Shaping with rolls | Shaping with rolls | Shaping with rolls | Shaping with rolls | Shaping with rolls |
| | Second step | | | — | Rolling imparting engraved lines | Rolling imparting engraved lines | Rolling imparting engraved lines | Rolling imparting engraved lines | Rolling imparting engraved lines |
| Expression | Expression (1): Ry(Ave) ≥ 0.020 × T + 16.6 | | | — | ○ | ○ | ○ | ○ | ○ |
| | Expression (2): Ry(Ave) ≥ 0.025 × T + 14.0 | | | — | ○ | ○ | X | X | X |
| | Expression (3): Ry(Max) ≤ 0.0195 × T + 33.2 | | | — | ○ | ○ | ○ | ○ | ○ |
| | Expression (4): Ry(Max) ≤ 0.0159 × T + 32.2 | | | — | X | X | ○ | ○ | ○ |
| Evaluation | Deaeration properties in production of laminated glass | Parallel light transmittance Tp | | % | 64 | 56 | 47 | 47 | 48 |
| | | Judgement | | — | ○ | ○ | ○ | ○ | ○ |
| | Sealing properties in production of laminated glass | Sealing temperature | | °C. | 75 | 75 | 55 | 65 | 70 |
| | | Judgement | | — | ○ | ○ | ○ | ○ | ○ |

| | | | | | Example 16 | Example 17 | Example 18 | Example 19 | Example 20 |
|---|---|---|---|---|---|---|---|---|---|
| Interlayer film for a laminated glass | Thickness | | | μm | 900 | 1300 | 1240 | 1470 | 1050 |
| | Recess | First surface | Ry | μm | 39 | 48 | 49 | 51 | 43 |
| | | | Sm | μm | 186 | 500 | 200 | 187 | 505 |
| | | Second surface | Ry | μm | 35 | 48 | 45 | 52 | 36 |
| | | | Sm | μm | 175 | 485 | 195 | 185 | 480 |
| | | Average | Ry(Ave) | μm | 37 | 48 | 47 | 52 | 40 |
| | | | Sm(Ave) | μm | 181 | 493 | 198 | 186 | 493 |
| | | | Ry(max) | μm | 39 | 48 | 49 | 52 | 43 |

TABLE 2-continued

| Shaping | First step | | — | Shaping with rolls | Shaping with rolls | Shaping with rolls | Shaping with rolls | Shaping with rolls |
|---|---|---|---|---|---|---|---|---|
| | Second step | | — | Rolling imparting engraved lines | Rolling imparting engraved lines | Rolling imparting engraved lines | Rolling imparting engraved lines | Rolling imparting engraved lines |
| Expression | Expression (1): Ry(Ave) ≥ 0.020 × T + 16.6 | | — | ○ | ○ | ○ | ○ | ○ |
| | Expression (2): Ry(Ave) ≥ 0.025 × T + 14.0 | | — | ○ | ○ | ○ | ○ | X |
| | Expression (3): Ry(Max) ≤ 0.0195 × T + 33.2 | | — | ○ | ○ | ○ | ○ | ○ |
| | Expression (4): Ry(Max) ≤ 0.0159 × T + 32.2 | | — | ○ | ○ | ○ | ○ | ○ |
| Evaluation | Deaeration properties in production of laminated glass | Parallel light transmittance Tp | % | 50 | 53 | 53 | 53 | 47 |
| | | Judgement | — | ○ | ○ | ○ | ○ | ○ |
| | Sealing properties in production of laminated glass | Sealing temperature | °C. | 55 | 70 | 70 | 70 | 65 |
| | | Judgement | — | ○ | ○ | ○ | ○ | ○ |

TABLE 3

| | | | | Example 21 | Example 22 | Example 23 | Example 24 | Example 25 |
|---|---|---|---|---|---|---|---|---|
| Interlayer film for a laminated glass | Thickness | | μm | 1400 | 860 | 1350 | 1250 | 1470 |
| | Recess | First surface Ry | μm | 48 | 39 | 53 | 55 | 57 |
| | | Sm | μm | 187 | 186 | 500 | 200 | 187 |
| | | Second surface Ry | μm | 48 | 37 | 53 | 48 | 57 |
| | | Sm | μm | 185 | 175 | 489 | 194 | 185 |
| | | Average Ry(Ave) | μm | 48 | 38 | 53 | 52 | 57 |
| | | Sm(Ave) | μm | 186 | 181 | 495 | 197 | 186 |
| | | Ry(max) | μm | 48 | 39 | 53 | 55 | 57 |
| Shaping | First step | | — | Shaping with rolls | Shaping with rolls | Shaping with rolls | Shaping with rolls | Shaping with rolls |
| | Second step | | — | Rolling imparting engraved lines | Rolling imparting engraved lines | Rolling imparting engraved lines | Rolling imparting engraved lines | Rolling imparting engraved lines |
| Expression | Expression (1): Ry(Ave) ≥ 0.020 × T + 16.6 | | — | ○ | ○ | ○ | ○ | ○ |
| | Expression (2): Ry(Ave) ≥ 0.025 × T + 14.0 | | — | X | ○ | ○ | ○ | ○ |
| | Expression (3): Ry(Max) ≤ 0.0195 × T + 33.2 | | — | ○ | ○ | ○ | ○ | ○ |
| | Expression (4): Ry(Max) ≤ 0.0159 × T + 32.2 | | — | ○ | ○ | ○ | X | X |
| Evaluation | Deaeration properties in production of laminated glass | Parallel light transmittance Tp | % | 48 | 50 | 56 | 61 | 59 |
| | | Judgement | — | ○ | ○ | ○ | ○ | ○ |
| | Sealing properties in production of laminated glass | Sealing temperature | °C. | 70 | 65 | 75 | 75 | 75 |
| | | Judgement | — | ○ | ○ | ○ | ○ | ○ |

| | | | | Example 26 | Example 27 | Example 28 | Example 29 | Example 30 |
|---|---|---|---|---|---|---|---|---|
| Interlayer film for a laminated glass | Thickness | | μm | 1100 | 1550 | 1000 | 1200 | 1000 |
| | Recess | First surface Ry | μm | 45 | 54 | 45 | 47 | 45 |
| | | Sm | μm | 189 | 187 | 550 | 300 | 200 |
| | | Second surface Ry | μm | 43 | 56 | 45 | 50 | 45 |
| | | Sm | μm | 183 | 185 | 530 | 305 | 198 |
| | | Average Ry(Ave) | μm | 44 | 55 | 45 | 49 | 45 |
| | | Sm(Ave) | μm | 186 | 186 | 540 | 303 | 199 |
| | | Ry(max) | μm | 45 | 56 | 45 | 50 | 45 |

TABLE 3-continued

| Shaping | First step | — | Shaping with rolls | Shaping with rolls | Melt fracture | Shaping with rolls | Melt fracture |
|---|---|---|---|---|---|---|---|
| | Second step | — | Rolling imparting engraved lines | Rolling imparting engraved lines | — | Rolling imparting engraved lines | Rolling imparting engraved lines |
| Expression | Expression (1): Ry(Ave) ≥ 0.020 × T + 16.6 | — | ◯ | ◯ | ◯ | ◯ | ◯ |
| | Expression (2): Ry(Ave) ≥ 0.025 × T + 14.0 | — | ◯ | ◯ | ◯ | ◯ | ◯ |
| | Expression (3): Ry(Max) ≤ 0.0195 × T + 33.2 | — | ◯ | ◯ | ◯ | ◯ | ◯ |
| | Expression (4): Ry(Max) ≤ 0.0159 × T + 32.2 | — | ◯ | ◯ | ◯ | ◯ | ◯ |
| Evaluation | Deaeration properties in production of laminated glass | Parallel light transmittance Tp | % | 54 | 48 | 45 | 58 | 60 |
| | | Judgement | — | ◯ | ◯ | ◯ | ◯ | ◯ |
| | Sealing properties in production of laminated glass | Sealing temperature | °C. | 70 | 75 | 60 | 70 | 70 |
| | | Judgement | — | ◯ | ◯ | ◯ | ◯ | ◯ |

TABLE 4

| | | | | Example 31 | Comparative Example 1 | Comparative Example 2 | Comparative Example 3 |
|---|---|---|---|---|---|---|---|
| Interlayer film for a laminated glass | Thickness | | μm | 1050 | 1050 | 1490 | 1150 |
| | Recess | First surface Ry | μm | 50 | 39 | 46 | 38 |
| | | First surface Sm | μm | 300 | 202 | 187 | 384 |
| | | Second surface Ry | μm | 46 | 35 | 44 | 35 |
| | | Second surface Sm | μm | 289 | 200 | 185 | 350 |
| | | Average Ry(Ave) | μm | 48 | 37 | 45 | 37 |
| | | Sm(Ave) | μm | 295 | 201 | 186 | 367 |
| | | Ry(max) | μm | 50 | 39 | 46 | 38 |
| Shaping | First step | | — | Shaping with rolls | Shaping with rolls | Shaping with rolls | Melt fracture |
| | Second step | | — | Rolling Imparting engraved lines | Rolling Imparting engraved lines | Rolling Imparting engraved lines | — |
| Expression | Expression (1): Ry(Ave) ≥ 0.020 × T + 16.6 | | — | ◯ | X | X | X |
| | Expression (2): Ry(Ave) ≥ 0.025 × T + 14.0 | | — | ◯ | X | X | X |
| | Expression (3): Ry(Max) ≤ 0.0195 × T + 33.2 | | — | ◯ | ◯ | ◯ | ◯ |
| | Expression (4): Ry(Max) ≤ 0.0159 × T + 32.2 | | — | ◯ | ◯ | ◯ | ◯ |
| Evaluation | Deaeration properties in production of laminated glass | Parallel light transmittance Tp | % | 59 | 38 | 37 | 38 |
| | | Judgement | — | ◯ | X | X | X |
| | Sealing properties in production of laminated glass | Sealing temperature | °C. | 75 | 60 | 65 | 55 |
| | | Judgement | — | ◯ | ◯ | ◯ | ◯ |

TABLE 5

| | | | | | | Example 32 | Exampe 33 | Exampe 34 | Exampe 35 | Example 36 |
|---|---|---|---|---|---|---|---|---|---|---|
| Interlayer film for a laminated glass | Thickest portion | Thickness | | | μm | 1240 | 1520 | 1100 | 1350 | 1350 |
| | | Recess | First surface | Ry | μm | 57 | 62 | 54 | 60 | 51 |
| | | | | Sm | μm | 200 | 201 | 183 | 200 | 180 |
| | | | Second surface | Ry | μm | 55 | 59 | 52 | 61 | 52 |
| | | | | Sm | μm | 187 | 192 | 172 | 187 | 171 |

TABLE 5-continued

|  |  |  |  |  | Example 32 | Exampe 33 | Exampe 34 | Exampe 35 | Example 36 |
|---|---|---|---|---|---|---|---|---|---|
|  |  |  | Average | Ry(Ave) μm | 56 | 61 | 53 | 61 | 52 |
|  |  |  |  | Sm(Ave) μm | 194 | 197 | 178 | 194 | 176 |
|  |  |  |  | Ry(max) μm | 57 | 62 | 54 | 61 | 52 |
|  | thinnest portion | Thickness |  | μm | 790 | 880 | 820 | 800 | 800 |
|  |  | Recess | First surface | Ry μm | 48 | 44 | 48 | 46 | 52 |
|  |  |  |  | Sm μm | 199 | 194 | 180 | 202 | 181 |
|  |  |  | Second surface | Ry μm | 48 | 48 | 43 | 46 | 52 |
|  |  |  |  | Sm μm | 185 | 195 | 171 | 190 | 170 |
|  |  |  | Average | Ry(Ave) μm | 48 | 46 | 46 | 46 | 52 |
|  |  |  |  | Sm(Ave) μm | 192 | 195 | 176 | 196 | 176 |
|  |  |  |  | Ry(max) μm | 48 | 48 | 48 | 46 | 52 |
| Shaping | First step |  |  | — | Shaping with rolls | Shaping with rolls | Shaping with rolls | Shaping with rolls | Shaping with rolls |
|  | Second step |  |  | — | Rolling imparting engraved lines | Rolling imparting engraved lines | Rolling imparting engraved lines | Rolling imparting engraved lines | Rolling imparting engraved lines |
| Expression | Thickest portion | Expression (1): Ry(Ave) ≥ 0.020 × T + 16.6 |  | — | ◯ | ◯ | ◯ | ◯ | ◯ |
|  |  | Expression (2): Ry(Ave) ≥ 0.025 × T + 14.0 |  | — | ◯ | ◯ | ◯ | ◯ | ◯ |
|  |  | Expression (3): Ry(Max) ≤ 0.0195 × T + 33.2 |  | — | ◯ | ◯ | ◯ | X | ◯ |
|  |  | Expression (4): Ry(Max) ≤ 0.0159 × T + 32.2 |  | — | X | X | X | X | ◯ |
| Evaluation | Thickest portion | Deaeration properties in production of laminated glass | Parallel light transmittance Tp | % | 64 | 61 | 66 | 65 | 53 |
|  |  |  | Judgement | — | ◯ | ◯ | ◯ | ◯ | ◯ |
|  |  | Sealing properties in production of laminated glass | Sealing temperature | °C. | 75 | 75 | 75 | 80 | 70 |
|  |  |  | Judgement | — | ◯ | ◯ | ◯ | X | ◯ |
|  | Comprehensive evaluation |  | Judgement on deaeration properties | °C. | ◯ | ◯ | ◯ | ◯ | ◯ |

TABLE 6

|  |  |  |  |  |  | Example 37 | Example 38 | Example 39 | Example 40 |
|---|---|---|---|---|---|---|---|---|---|
| Interlayer film for a laminated glass | Thickest portion | Thickness |  |  | μm | 1080 | 1340 | 1550 | 1100 |
|  |  | Recess | First surface | Ry | μm | 50 | 52 | 56 | 45 |
|  |  |  |  | Sm | μm | 183 | 202 | 200 | 300 |
|  |  |  | Second surface | Ry | μm | 48 | 51 | 53 | 45 |
|  |  |  |  | Sm | μm | 178 | 200 | 198 | 298 |
|  |  |  | Average | Ry(Ave) | μm | 49 | 52 | 55 | 45 |
|  |  |  |  | Sm(Ave) | μm | 181 | 201 | 199 | 299 |
|  |  |  |  | Ry(max) | μm | 50 | 52 | 56 | 45 |
|  | thinnest portion | Thickness |  |  | μm | 770 | 800 | 970 | 800 |
|  |  | Recess | First surface | Ry | μm | 45 | 43 | 47 | 40 |
|  |  |  |  | Sm | μm | 185 | 204 | 195 | 303 |
|  |  |  | Second surface | Ry | μm | 42 | 40 | 44 | 40 |
|  |  |  |  | Sm | μm | 180 | 195 | 192 | 299 |
|  |  |  | Average | Ry(Ave) | μm | 44 | 42 | 46 | 40 |
|  |  |  |  | Sm(Ave) | μm | 183 | 200 | 194 | 301 |
|  |  |  |  | Ry(max) | μm | 46 | 43 | 47 | 40 |
| Shaping | First step |  |  |  | — | Shaping with rolls | Shaping with rolls | Shaping with rolls | Shaping with rolls |
|  | Second step |  |  |  | — | Rolling imparting engraved lines | Rolling imparting engraved lines | Rolling imparting engraved lines | Rolling imparting engraved lines |
| Expression | Thickest portion | Expression (1): Ry(Ave) ≥ 0.020 × T + 16.6 |  |  | — | ◯ | ◯ | ◯ | ◯ |
|  |  | Expression (2): Ry(Ave) ≥ 0.025 × T + 14.0 |  |  | — | ◯ | ◯ | ◯ | ◯ |
|  |  | Expression (3): Ry(Max) ≤ 0.0195 × T + 33.2 |  |  | — | ◯ | ◯ | ◯ | ◯ |
|  |  | Expression (4): Ry(Max) ≤ 0.0159 × T + 32.2 |  |  | — | X | ◯ | ◯ | ◯ |

TABLE 6-continued

|  |  |  |  |  | Example 37 | Example 38 | Example 39 | Example 40 |
|---|---|---|---|---|---|---|---|---|
| Evaluation | Thickest portion | Deaeration properties in production of laminated glass | Parallel light transmittance Tp | % | 62 | 54 | 52 | 55 |
|  |  |  | Judgement | — | ○ | ○ | ○ | ○ |
|  |  | Sealing properties in production of laminated glass | Sealing temperature | °C. | 75 | 70 | 70 | 70 |
|  |  |  | Judgement | — | ○ | ○ | ○ | ○ |
|  | Comprehensive evaluation |  | Judgement on deaeration properties | °C. | ○ | ○ | ○ | ○ |

TABLE 7

|  |  |  |  |  |  | Example 41 | Example 42 | Example 43 | Example 44 | Example 45 |
|---|---|---|---|---|---|---|---|---|---|---|
| Interlayer film for a laminated glass | Thickest portion | Thickness |  |  | μm | 1510 | 1150 | 1320 | 1530 | 1210 |
|  |  | Recess | First surface | Ry | μm | 47 | 41 | 51 | 51 | 47 |
|  |  |  |  | Sm | μm | 188 | 207 | 300 | 205 | 183 |
|  |  |  | Second surface | Ry | μm | 48 | 42 | 46 | 53 | 45 |
|  |  |  |  | Sm | μm | 180 | 201 | 398 | 199 | 174 |
|  |  |  | Average | Ry(Ave) | μm | 48 | 42 | 49 | 52 | 46 |
|  |  |  |  | Sm(Ave) | μm | 184 | 204 | 349 | 202 | 179 |
|  |  |  |  | Ry(max) | μm | 48 | 42 | 51 | 53 | 47 |
|  | thinnest portion | Thickness |  |  | μm | 850 | 800 | 820 | 970 | 820 |
|  |  | Recess | First surface | Ry | μm | 34 | 35 | 36 | 37 | 35 |
|  |  |  |  | Sm | μm | 182 | 205 | 298 | 202 | 183 |
|  |  |  | Second surface | Ry | μm | 36 | 35 | 36 | 39 | 36 |
|  |  |  |  | Sm | μm | 180 | 201 | 380 | 200 | 180 |
|  |  |  | Average | Ry(Ave) | μm | 35 | 35 | 36 | 38 | 36 |
|  |  |  |  | Sm(Ave) | μm | 181 | 203 | 339 | 201 | 182 |
|  |  |  |  | Ry(max) | μm | 36 | 35 | 36 | 39 | 36 |
| Shaping | First step |  |  |  | — | Shaping with rolls | Shaping with rolls | Shaping with rolls | Shaping with rolls | Shaping with rolls |
|  | Second step |  |  |  | — | Rolling imparting engraved lines | Rolling imparting engraved lines | Rolling imparting engraved lines | Rolling imparting engraved lines | Rolling imparting engraved lines |
| Expression | Thickest portion | Expression (1): Ry(Ave) ≥ 0.020 × T + 16.6 |  |  | — | ○ | ○ | ○ | ○ | ○ |
|  |  | Expression (2): Ry(Ave) ≥ 0.025 × T + 14.0 |  |  | — | X | X | ○ | X | ○ |
|  |  | Expression (3): Ry(Max) ≤ 0.0195 × T + 33.2 |  |  | — | ○ | ○ | ○ | ○ | ○ |
|  |  | Expression (4): Ry(Max) ≤ 0.0159 × T + 32.2 |  |  | — | ○ | ○ | ○ | ○ | ○ |
| Evaluation | Thickest portion | Deaeration properties in production of laminated glass | Parallel light transmittance Tp |  | % | 47 | 47 | 53 | 48 | 51 |
|  |  |  | Judgement |  | — | ○ | ○ | ○ | ○ | ○ |
|  |  | Sealing properties in production of laminated glass | Sealing temperature |  | °C. | 70 | 70 | 70 | 70 | 70 |
|  |  |  | Judgement |  | — | ○ | ○ | ○ | ○ | ○ |
|  | Comprehensive evaluation |  | Judgement on deaeration properties |  | °C. | ○ | ○ | ○ | ○ | ○ |

TABLE 8

| | | | | | | Example 46 | Example 47 | Example 48 | Example 49 | Example 50 |
|---|---|---|---|---|---|---|---|---|---|---|
| Interlayer film for a laminated glass | Thickest portion | Thickness | | | μm | 1350 | 1350 | 1600 | 1350 | 1270 |
| | | Recess | First surface | Ry | μm | 48 | 53 | 60 | 51 | 51 |
| | | | | Sm | μm | 202 | 480 | 200 | 183 | 180 |
| | | | Second surface | Ry | μm | 50 | 55 | 63 | 52 | 50 |
| | | | | Sm | μm | 200 | 466 | 195 | 178 | 175 |
| | | | Average | Ry(Ave) | μm | 49 | 54 | 62 | 52 | 51 |
| | | | | Sm(Ave) | μm | 201 | 473 | 198 | 181 | 178 |
| | | | | Ry(max) | μm | 50 | 55 | 63 | 52 | 51 |
| | thinnest portion | Thickness | | | μm | 800 | 830 | 950 | 830 | 820 |
| | | Recess | First surface | Ry | μm | 47 | 43 | 43 | 44 | 47 |
| | | | | Sm | μm | 202 | 490 | 198 | 189 | 186 |
| | | | Second surface | Ry | μm | 48 | 35 | 40 | 45 | 48 |
| | | | | Sm | μm | 195 | 480 | 189 | 180 | 178 |
| | | | Average | Ry(Ave) | μm | 48 | 39 | 42 | 45 | 48 |
| | | | | Sm(Ave) | μm | 199 | 485 | 194 | 185 | 182 |
| | | | | Ry(max) | μm | 48 | 43 | 43 | 45 | 48 |
| Shaping | First step | | | | — | Shaping with rolls | Shaping with rolls | Shaping with rolls | Shaping with rolls | Melt fracture |
| | Second step | | | | — | Rolling imparting engraved lines | Rolling imparting engraved lines | Rolling imparting engraved lines | Rolling imparting engraved lines | Rolling imparting engraved lines |
| Expression | Thickest portion | Expression (1): Ry(Ave) ≥ 0.020 × T + 16.6 | | | — | ○ | ○ | ○ | ○ | ○ |
| | | Expression (2): Ry(Ave) ≥ 0.025 × T + 14.0 | | | — | ○ | ○ | ○ | ○ | ○ |
| | | Expression (3): Ry(Max) ≤ 0.0195 × T + 33.2 | | | — | ○ | ○ | ○ | ○ | ○ |
| | | Expression (4): Ry(Max) ≤ 0.0159 × T + 32.2 | | | — | ○ | X | X | ○ | ○ |
| Evaluation | Thickest portion | Deaeration properties in production of laminated glass | Parallel light transmittance Tp | | % | 52 | 59 | 59 | 54 | 55 |
| | | | Judgement | | — | ○ | ○ | ○ | ○ | ○ |
| | | Sealing properties in production of laminated glass | Sealing temperature | | °C. | 70 | 75 | 70 | 70 | 70 |
| | | | Judgement | | — | ○ | ○ | ○ | ○ | ○ |
| | Comprehensive evaluation | | Judgement on deaeration properties | | °C. | ○ | ○ | ○ | ○ | ○ |

TABLE 9

| | | | | | | Example 51 | Comparative Example 4 | Comparative Example 5 | Comparative Example 6 |
|---|---|---|---|---|---|---|---|---|---|
| Interlayer film for a laminated glass | Thickest portion | Thickness | | | μm | 1500 | 1320 | 1340 | 1400 |
| | | Recess | First surface | Ry | μm | 60 | 39 | 41 | 35 |
| | | | | Sm | μm | 204 | 200 | 184 | 485 |
| | | | Second surface | Ry | μm | 68 | 41 | 44 | 38 |
| | | | | Sm | μm | 206 | 194 | 178 | 520 |
| | | | Average | Ry(Ave) | μm | 64 | 40 | 43 | 37 |
| | | | | Sm(Ave) | μm | 205 | 197 | 181 | 503 |
| | | | | Ry(max) | μm | 68 | 41 | 44 | 38 |
| | thinnest portion | Thickness | | | μm | 920 | 800 | 870 | 820 |
| | | Recess | First surface | Ry | μm | 43 | 39 | 33 | 38 |
| | | | | Sm | μm | 198 | 200 | 182 | 503 |
| | | | Second surface | Ry | μm | 45 | 40 | 33 | 34 |
| | | | | Sm | μm | 195 | 186 | 179 | 460 |
| | | | Average | Ry(Ave) | μm | 44 | 40 | 33 | 36 |
| | | | | Sm(Ave) | μm | 197 | 193 | 181 | 482 |
| | | | | Ry(max) | μm | 45 | 40 | 33 | 38 |
| Shaping | First step | | | | — | Shaping with rolls | Shaping with rolls | Shaping with rolls | Melt fracture |
| | Second step | | | | — | Rolling imparting engraved lines | Rolling imparting engraved lines | Rolling imparting engraved lines | — |

TABLE 9-continued

|  |  |  |  | Example 51 | Comparative Example 4 | Comparative Example 5 | Comparative Example 6 |
|---|---|---|---|---|---|---|---|
| Expression | Thickest portion | Expression (1): Ry(Ave) ≥ 0.020 × T + 16.6 |  | — | ○ | X | X | X |
|  |  | Expression (2): Ry(Ave) ≥ 0.025 × T + 14.0 |  | — | ○ | X | X | X |
|  |  | Expression (3): Ry(Max) ≤ 0.0195 × T + 33.2 |  | — | X | ○ | ○ | ○ |
|  |  | Expression (4): Ry(Max) ≤ 0.0159 × T + 32.2 |  | — | X | ○ | ○ | ○ |
| Evaluation | Thickest portion | Deaeration properties in production of laminated glass | Parallel light transmittance Tp | % | 64 | 36 | 43 | 34 |
|  |  |  | Judgement | — | ○ | X | X | X |
|  |  | Sealing properties in production of laminated glass | Sealing temperature | °C. | 80 | 65 | 65 | 60 |
|  |  |  | Judgement | — | X | ○ | ○ | ○ |
|  | Comprehensive evaluation | Judgement on deaeration properties |  | °C. | ○ | X | X | X |

TABLE 10

|  |  |  |  |  | Example 52 | Example 53 | Example 54 | Example 55 | Example 56 | Comparative Example 7 |
|---|---|---|---|---|---|---|---|---|---|---|
| Composition of film | Protective layer | Polyvinyl butyral resin | Butyral group content | mol % | 69 | 69 | 69 | 69 | 70 | 69 |
|  |  |  | Hydroxy group content | mol % | 30 | 30 | 30 | 30 | 28 | 30 |
|  |  |  | Acetyl group content | mol % | 1 | 1 | 1 | 1 | 2 | 1 |
|  |  |  | Degree of polymerization | phr | 1700 | 1700 | 1700 | 1700 | 1700 | 1700 |
|  |  |  | Amount | phr | 100 | 100 | 100 | 100 | 100 | 100 |
|  |  | Plasticizer | Type | — | 3GO | 3GO | 3GO | 3GO | 3GO | 3GO |
|  |  |  | Amount | phr | 36 | 37 | 37 | 37 | 39 | 38 |
|  |  | Shape | Cross-sectional shape | — | Wedge shape | Wedge shape | Wedge shape | Wedge shape | Wedge shape | Wedge shape |
|  |  |  | Total maximum thickness | μm | 1180 | 1300 | 1330 | 1220 | 1170 | 1210 |
|  |  |  | Total minimum thickness | μm | 720 | 770 | 850 | 730 | 700 | 700 |
|  | Sound insulation layer | Polyvinyl butyral resin | Butyral group content | mol % | 66 | 71 | 71 | 71 | 79 | 66 |
|  |  |  | Hydroxy group content | mol % | 22 | 22 | 22 | 22 | 20 | 22 |
|  |  |  | Acetyl group content | mol % | 12 | 7 | 7 | 7 | 1 | 12 |
|  |  |  | Degree of polymerization | phr | 2300 | 2300 | 2300 | 2300 | 2300 | 2300 |
|  |  |  | Amount | phr | 100 | 100 | 100 | 100 | 100 | 100 |
|  |  | Plasticizer | Type | — | 3GO | 3GO | 3GO | 3GO | 3GO | 3GO |
|  |  |  | Amount | phr | 78 | 77 | 77 | 77 | 75 | 60 |
|  |  | Shape | Cross-sectional shape | — | Wedge shape | Wedge shape | Wedge shepe | Wedge shape | Wedge shape | Wedge shape |
|  |  |  | Total maximum thickness | μm | 160 | 200 | 180 | 150 | 120 | 120 |
|  |  |  | Total minimum thickness | μm | 100 | 110 | 120 | 100 | 100 | 100 |

TABLE 10-continued

| | | | | | | Example 52 | Example 53 | Example 54 | Example 55 | Example 56 | Comparative Example 7 |
|---|---|---|---|---|---|---|---|---|---|---|---|
| Shape of film | Thickest portion | Thickness | | | μm | 1320 | 1500 | 1510 | 1370 | 1290 | 1330 |
| | | Recess | First surface | Ry | μm | 61 | 50 | 52 | 52 | 50 | 39 |
| | | | | Sm | μm | 300 | 200 | 205 | 480 | 185 | 205 |
| | | | Second surface | Ry | μm | 46 | 48 | 53 | 55 | 49 | 41 |
| | | | | Sm | μm | 398 | 195 | 199 | 466 | 190 | 192 |
| | | | Average | Ry(Ave) | μm | 49 | 49 | 53 | 54 | 50 | 40 |
| | | | | Sm(Ave) | μm | 349 | 198 | 202 | 473 | 188 | 199 |
| | | | | Ry(max) | μm | 51 | 50 | 53 | 55 | 50 | 41 |
| | Thinnest portion | Thickness | | | μm | 820 | 880 | 970 | 830 | 800 | 800 |
| | | Recess | First surface | Ry | μm | 36 | 35 | 35 | 42 | 43 | 37 |
| | | | | Sm | μm | 298 | 200 | 200 | 480 | 195 | 202 |
| | | | Second surface | Ry | μm | 36 | 35 | 35 | 36 | 44 | 40 |
| | | | | Sm | μm | 380 | 200 | 200 | 470 | 190 | 187 |
| | | | Average | Ry(Ave) | μm | 36 | 35 | 35 | 38 | 44 | 39 |
| | | | | Sm(Ave) | μm | 339 | 200 | 200 | 475 | 193 | 195 |
| | | | | Ry(max) | μm | 36 | 35 | 35 | 42 | 44 | 40 |
| | Structure of film | | | | — | Protective layer/ sound insulation layer/ protective layer | Protective layer/ sound insulation layer/ protective layer | Protective layer/ sound insulation layer/ protective layer | Protective layer/ sound insulation layer/ protective layer | Protective layer/ sound insulation layer/ protective layer | Protective layer/ sound insulation layer/ protective layer |
| Shaping | First step | | | | — | Shaping with rolls | Shaping with rolls | Shaping with rolls | Shaping with rolls | Melt fracture | Shaping with rolls |
| | Second step | | | | — | Rolling imparting engraved lines | Rolling imparting engraved lines | Rolling imparting engraved lines | Rolling imparting engraved lines | Rolling imparting engraved lines | Rolling Imparting engraved lines |
| Expression | Thickest portion | Expression (1): Ry(Ave) ≥ 0.020 × T + 16.6 | | | — | ○ | ○ | ○ | ○ | ○ | X |
| | | Expression (2): Ry(Ave) ≥ 0.025 × T + 14.0 | | | — | ○ | X | ○ | ○ | ○ | X |
| | | Expression (3): Ry(Max) ≤ 0.0195 × T + 33.2 | | | — | ○ | ○ | ○ | ○ | ○ | ○ |
| | | Expression (4): Ry(Max) ≤ 0.0159 × T + 32.2 | | | — | ○ | ○ | ○ | X | ○ | ○ |
| Evaluation | Thickest portion | Deaeration properties in production of laminated glass | Parallel light transmittance Tp | | % | 52 | 48 | 53 | 59 | 55 | 37 |
| | | | Judgement | | — | ○ | ○ | ○ | ○ | ○ | X |
| | | Sealing properties in production of laminated glass | Sealing temperature | | °C. | 70 | 70 | 70 | 75 | 70 | 65 |
| | | | Judgement | | — | ○ | ○ | ○ | ○ | ○ | ○ |
| | Comprehensive evaluation | | Judgement on deaeration properties | | °C. | ○ | ○ | ○ | ○ | ○ | X |

Figure 8:
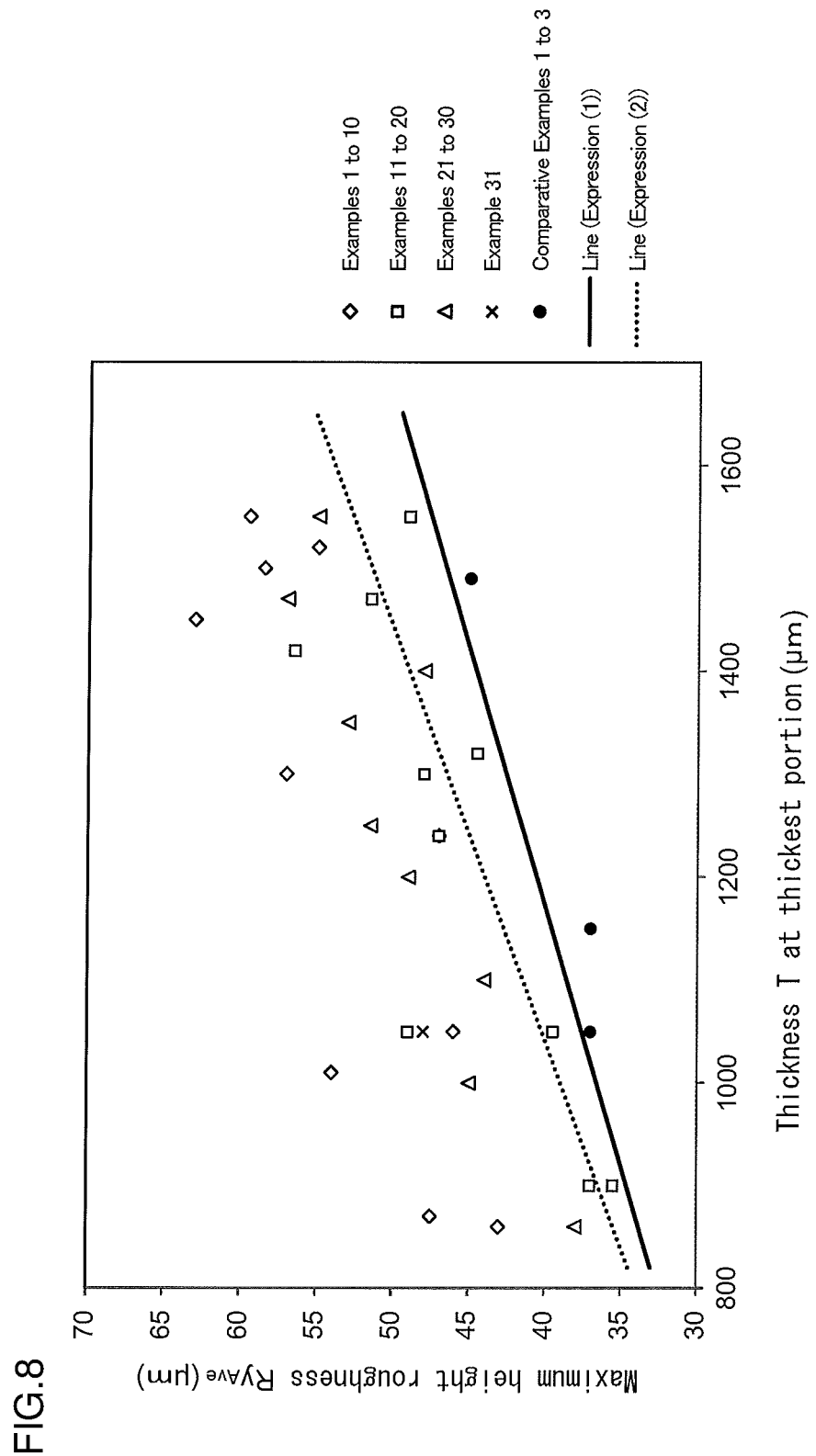
FIG. 8 is a scatter diagram with the thickness T (μm) at the thickest portion of the film on the horizontal axis and the maximum height roughness Ry(Ave) (μm) on the vertical axis, in which evaluation results of interlayer films for a laminated glass obtained in examples and comparative examples are plotted.

FIG. 8 is a scatter diagram with the thickness T (μm) at the thickest portion of the film on the horizontal axis and the maximum height roughness Ry(Ave) (μm) on the vertical axis, in which evaluation results of the interlayer films for a laminated glass obtained in the examples and comparative examples are plotted.

According to FIG. 8, two lines including a line (expression (1)) of "Ry=0.020×T+16.6" corresponding to the above expression (1) and a line (expression (2)) of "Ry=0.025×T+14.0" corresponding to the above expression (2) can be drawn. FIG. 8 shows that, when Ry is equal to or higher than the line (expression (1)), excellent deaeration properties can be exhibited to produce a laminated glass with high transparency and when Ry is equal to or higher than the line (expression (2)), further excellent deaeration properties can be exhibited to produce a laminated glass with still higher transparency.

INDUSTRIAL APPLICABILITY

The present invention can provide an interlayer film for a laminated glass that can, even when having a thickness at the thickest portion of 850 μm or more, exhibit sufficient deaeration properties in production of a laminated glass to provide a laminated glass with high transparency, and a laminated glass produced using the interlayer film for a laminated glass.

REFERENCE SIGNS LIST

5 Interlayer film for a laminated glass
51 Sound insulation layer
52 Protective layer
6 Interlayer film for a laminated glass
61 Sound insulation layer
62 Protective layer
63 Protective layer
7 Interlayer film for a laminated glass
71 Sound insulation layer
72 Protective layer
73 Protective layer

The invention claimed is:

1. An interlayer film for a laminated glass having a large number of recesses on at least one surface,
   the interlayer film for a laminated glass having a thickness T (μm) measured in conformity with JIS K-6732 (1996) at a thickest portion and a maximum height roughness Ry (μm) measured in conformity with JIS B-0601 (1994) at & the thickest portion,
   wherein the thickness T and the maximum height roughness Ry satisfy the following expressions (1) and (1'):

$$Ry(\text{ave}) \geq 0.020 \times T + 16.6 \quad (1),$$

$$T \geq 850 \quad (1'),$$

wherein Ry (ave) is an average of the maximum height roughness Ry on a first surface of the interlayer film for a laminated glass and the maximum height roughness Ry on a second surface of the interlayer film for a laminated glass, and
   wherein the thickness T and the maximum height roughness Ry further satisfy the following expression (3):

$$Ry(\text{max}) \leq 0.0195 \times T + 33.2 \quad (3),$$

wherein Ry (max) is the larger of the maximum height roughness Ry on the first surface of the interlayer film for a laminated glass and the maximum height roughness Ry on the second surface of the interlayer film for a laminated glass.

2. The interlayer film for a laminated glass according to claim 1,
   wherein the thickness T and the maximum height roughness Ry further satisfy the following expression (2):

$$Ry \geq 0.025 \times T + 14.0 \quad (2).$$

3. The interlayer film for a laminated glass according to claim 1,
   wherein the thickness T and the maximum height roughness Ry further satisfy the following expression (4):

$$Ry \leq 0.0159 \times T + 32.2 \quad (4).$$

4. The interlayer film for a laminated glass according to claim 1,
   wherein the thickness T satisfies $T \geq 860$.

5. The interlayer film for a laminated glass according to claim 4,
   wherein the thickness T satisfies $T \geq 1,000$.

6. The interlayer film for a laminated glass according to claim 1,
   wherein the recesses each have a groove shape with a continuous bottom, and the recesses adjacent to each other are regularly formed in parallel to each other.

7. The interlayer film for a laminated glass according to claim 6,
   wherein an interval Sm between the recesses is 600 μm or shorter.

8. The interlayer film for a laminated glass according to claim 1,
   which has a laminated structure including two or more resin layers stacked in a thickness direction.

9. The interlayer film for a laminated glass according to claim 1,
   which has a wedge-shaped cross section.

10. A laminated glass comprising:
    a pair of glass plates; and
    the interlayer film for a laminated glass according to claim 1 interposed between the pair of glass plates.

11. The interlayer film for a laminated glass according to claim 1,
    wherein the thickness T satisfies $T \leq 2,800$.

12. The interlayer film for a laminated glass according to claim 1,
    wherein the upper limits of the maximum height roughness Ry on a first surface and the maximum height roughness Ry on a second surface are respectively 80 μm.

* * * * *